(12) United States Patent
Kurihara et al.

(10) Patent No.: US 8,022,139 B2
(45) Date of Patent: Sep. 20, 2011

(54) POLYLACTIC ACID COMPOSITION

(75) Inventors: Toyoaki Kurihara, Kamisu (JP); Kenichi Hamada, Kamisu (JP); Akiko Ide, Tokyo (JP); Eiji Iwasa, Osaka (JP); Tomokazu Ise, Tokyo (JP); Yoshihiro Morishita, Kamisu (JP); Hiroshi Oshima, Kamisu (JP)

(73) Assignee: Kuraray Co., Ltd., Kurashiki-shi (JP)

( * ) Notice: Subject to any disclaimer, the term of this patent is extended or adjusted under 35 U.S.C. 154(b) by 203 days.

(21) Appl. No.: 12/092,978

(22) PCT Filed: Nov. 21, 2006

(86) PCT No.: PCT/JP2006/323174
§ 371 (c)(1),
(2), (4) Date: May 8, 2008

(87) PCT Pub. No.: WO2007/060930
PCT Pub. Date: May 31, 2007

(65) Prior Publication Data
US 2009/0239433 A1    Sep. 24, 2009

(30) Foreign Application Priority Data

Nov. 25, 2005 (JP) ............................ 2005-339628
Nov. 25, 2005 (JP) ............................ 2005-339629
Mar. 28, 2006 (JP) ............................ 2006-089022
Mar. 28, 2006 (JP) ............................ 2006-089035

(51) Int. Cl.
*C08L 53/00* (2006.01)

(52) U.S. Cl. ..... 525/88; 525/92 B; 525/92 E; 525/92 D; 525/92 F

(58) Field of Classification Search .............. 525/88, 525/92 B, 92 D, 92 E, 92 F
See application file for complete search history.

(56) References Cited

U.S. PATENT DOCUMENTS

| | | | |
|---|---|---|---|
| 4,772,664 A | * | 9/1988 | Ueda et al. ............... 525/92 B |
| 5,539,079 A | * | 7/1996 | Cramer et al. ............ 528/336 |
| 2004/0147674 A1 | * | 7/2004 | Kakeda et al. ............ 525/88 |
| 2004/0164434 A1 | * | 8/2004 | Tabar et al. .............. 264/1.6 |
| 2005/0085592 A1 | * | 4/2005 | Taniguchi et al. ........ 525/242 |
| 2005/0131120 A1 | | 6/2005 | Flexman |

FOREIGN PATENT DOCUMENTS

| | | | |
|---|---|---|---|
| EP | 1785453 | * | 5/2007 |
| JP | 2002 155207 | | 5/2002 |
| JP | 2003 286401 | | 10/2003 |
| JP | 2004 269720 | | 9/2004 |
| JP | 2006 225413 | | 8/2006 |
| JP | 2007 23145 | | 2/2007 |
| WO | 02 092696 | | 11/2002 |
| WO | WO 2004/087812 A1 | | 10/2004 |
| WO | WO 2005/085352 A1 | | 9/2005 |
| WO | WO2005123831 | * | 12/2005 |

OTHER PUBLICATIONS

Lalande et al., "Microdeformation mechanisms in rubber toughened PMMA and PMMA-based copolymers," Jun. 2006, Engineering Fracture Mechanics, 73 (2006), 2413-2426.*

* cited by examiner

*Primary Examiner* — Jeffrey C Mullis
(74) *Attorney, Agent, or Firm* — Oblon, Spivak, McClelland, Maier & Neustadt, L.L.P.

(57) ABSTRACT

A polylactic acid composition comprising (A) a polylactic acid-series resin and (B) an acrylic triblock copolymer is prepared. The composition fulfills the following requirements: (1) the acrylic triblock copolymer (B) is a triblock polymer comprising (B1) a polymer block having a glass-transition temperature of not higher than 25° C., (B2a) a polymer block which has a glass-transition temperature of not lower than 60° C. and is bound to a terminal of the polymer block (B1), and (B2b) a polymer block which has a glass-transition temperature of not lower than 60° C. and is bound to another terminal thereof; (2) the polymer block (B1) comprises a main structural unit derived from an acrylate, and the polymer block (B2a) and the polymer block (B2b) independently comprise a main structural unit derived from a methacrylate; and (3) both of the weight-average molecular weights of the polymer block (B2a) and polymer block (B2b) are smaller than the weight-average molecular weight of the polymer block (B1). The polylactic acid-series resin (A) and the acrylic triblock copolymer (B) may form a phase separation structure.

21 Claims, 7 Drawing Sheets

POLYLACTIC ACID COMPOSITION

TECHNICAL FIELD

The present invention relates to a polylactic acid composition. More specifically, the invention relates to a polylactic acid composition having an excellent flexibility, superb moldability (or molding processability), great thermal adhesiveness, and a high moisture permeability while maintaining the inherent transparency. Furthermore the composition has excellent mechanical properties (such as an impact resistance, a flex resistance, and a stretching property), and a suppressed bleed out of the component. The invention also relates to a molded product comprising the polylactic acid composition (for example, various molded products having a three-dimensional from, a fiber product, and a film). Moreover, the present invention relates to an adhesive film having an adhesive layer formed on a substrate film comprising the polylactic acid composition as well as a tarpaulin and a composite molded product which comprise the polylactic acid composition.

BACKGROUND ART

Various plastics have been mass-produced from an oil-based resource (or a petroleum) as raw materials and widely used. Such plastics include, for example, a polyvinyl chloride, a polyolefin (e.g., a polyethylene, and a polypropylene), a polystyrene, a polyester (e.g., a polyethylene terephthalate, and a polybutylene terephthalate), and a polyamide such as a polyamide 6.

The above-mentioned plastics are generally durable and degrade very slowly in a natural environment. Most of the spent products comprising the plastics are incinerated, and unfortunately, only the limited kinds of the spent products are collected for recycling. The incineration of the spent plastic products generates carbon dioxide, which is a cause of global warming. Furthermore, the incineration of a plastic containing a halogen (such as a polyvinyl chloride) or a plastic containing a heteroatom (such as nitrogen, phosphorus, or sulfur) often tends to generate a toxic gas.

In addition, the petroleum is a limited resource. Since the plastic is made from the petroleum as a raw material, the decrease in the amount supplied of the petroleum or the depletion thereof will often cause an increase in the production cost of the plastic. In the worst case, the production is expected to be abandoned.

To overcome the above-mentioned problems, various researches, developments, and productions of biodegradable polymers, which are degraded by a bacteria or polymers which are degraded by hydrolysis or the like due to other factors under a natural environment, have been flourished in these years. In addition, the researches and developments of polymers which can be produced not from the petroleum, which is a limited resource, but from a renewable recourse as a raw material, have been progressing for recent years.

A polylactic acid, which is one of aliphatic polyesters, is biodegradable and can be produced not from the petroleum, but from a plant, which is a renewable recourse, as a raw material. For that reason, the polylactic acid has been attracting attention in recent years. The polylactic acid is usually produced by ring opening polymerization of lactide, which is a cyclic compound obtainable by dehydrating condensation of two lactic acid molecules by direct polymerization of lactic acid. Lactic acid, which is a raw material for the polylactic acid, can be produced by lactic acid fermentation of a saccharide as a raw material derived from a renewable plant [e.g., a saccharide obtainable by decomposition of a carbohydrate (such as starch) contained in grain (or corn) pulse crops, tubers (or corms) and a saccharide contained in a sugarcane].

The spent polylactic acid is left in a natural environment or buried in soil and gradually decomposed. The spent polylactic acid is also incinerated, which generates carbon dioxide as well as the incineration of the plastics produced from the petroleum as a raw material. However, the plant, which is a raw material for the polylactic acid, uses (or absorbs) carbon dioxide in the air at photosynthesis, in which the carbon dioxide is converted to a carbohydrate in the plant for the growth. Such a circulation of carbon dioxide through the generation by the incineration and the absorption by the plant forms a generation-consumption cycle of carbon dioxide. Owing to such a cycle the incineration of the polylactic acid dose not change the whole quantity of carbon dioxide in the air is the same after all, whereby the polylactic acid is an environment-friendly material. In this regard, the polylactic acid is more advantageous than the plastic produced from the petroleum as a raw material, since the plastic only generates carbon dioxide by the incineration.

Since the polylactic acid is produced at a relatively low production cost and has a transparency and a melt-moldability, the polylactic acid is used for a film, a sheet, or the like. However, since the polylactic acid is hard (or rigid) and breakable (or fragile) and has a poor flexibility or impact resistance, the polylactic acid is not suitable to use. Such disadvantages require to be overcome. To improve the shortcomings, for example, a plasticizer is added to the polylactic acid to imparting flexibility thereto. However, the bleed out of the plasticizer tends to occur, which spoils the effect of the plasticizer.

Accordingly, Japanese Patent Application Laid-Open Publication No. 286401/2003 (JP-2003-286401A, Patent Document 1) suggests a polylactic acid composition comprising a polylactic acid and an unsaturated carboxylic alkyl ester-series polymer having a weight-average molecular weight of not more than 30,000 to impart a flexibility thereto without deteriorating the transparency of the polylactic acid. In the polylactic acid composition of the Patent Document 1, practically, a homopolymer of an alkyl acrylate, a copolymer of alkyl acrylates, a random copolymer of an alkyl acrylate and a methacrylate, which independently has a weight-average molecular weight of not more than 5000, is used as an unsaturated carboxylic alkyl ester-series polymer to improve the flexibility. While the flexibility is enough improved, the composition still has a poor impact resistance and mechanical properties, a sticky texture, or the like. In some cases, the bleed out of the unsaturated carboxylic alkyl ester-series polymer occurs.

Moreover, Japanese Patent Application Laid-Open Publication No. 269720/2004 (JP-2004-269720A, Patent Document 2) suggests a polylactic acid composition comprising a polylactic acid and an acrylic polymer having a methyl methacrylate unit and an alkyl acrylate unit to improve the heat resistance, with maintaining the transparency of the polylactic acid. In the invention of Patent Document 2, it is recommended that an acrylic copolymer containing a methyl methacrylate unit of not more than 50% by weight and an alkyl acrylate unit of not less than 50% by weight be used as the acrylic polymer to improve the heat resistance. According to the invention of Patent Document 2, while the heat resistance is improved in some degree, unfortunately, the obtainable polylactic acid composition and a molded product thereof do not have excellent flexibility, impact resistance, flex fatigue resistance, and thermal adhesiveness. In addition, the composition and the molded product are not oil resources-saving.

Furthermore, Japanese Patent Application Laid-Open Publication No. 155207/2002 (JP-2002-155207A, Patent Document 3) suggests a thermoplastic polymer composition comprising a polyester resin (such as a polyethylene terephthalate or a polylactic acid) and an acrylic polymer having a number-average molecular weight of 800 to 20000, in order to obtain a thermoplastic polymer composition having an excellent weather resistance and moldability. In Patent Document 3, an acrylic acid-α-methylstyrene-styrene copolymer, a 2-ethylhexyl acrylate polymer, or the like is used as the acrylic polymer. Unfortunately, the thermoplastic composition of Patent Document 3 still has a poor flexibility, impact resistance, flex fatigue resistance, transparency, heat resistance, or the like.

Moreover, WO 2002/092696 publication (Patent Document 4) suggests a thermoplastic resin composition comprising (a) a thermoplastic resin and (b) a block copolymer comprising (A) a methacrylic polymer block and (B) an acrylic polymer block. In Patent Document 4, a polylactic acid is an example of many thermoplastic resins included in the thermoplastic resin (a). In Examples, a polybutylene terephthalate, a polyamide, a polyvinyl chloride, and a methacrylic resin are used. The document discloses an A-B-A type triblock polymer as the block copolymer (b). The A-B-A type triblock polymer is obtainable by living polymerization using a halogen-containing compound as an initiator. However, the use of the triblock polymer of Patent Document 4 deteriorates the heat resistance of the composition, and tends to cause the bleed out of the components from the composition or a molded product thereof. In addition, coping with both flexibility and toughness is difficult.

[Patent Document 1] JP-2003-286401A
[Patent Document 2] JP-2004-269720A
[Patent Document 3] JP-2002-155207A
[Patent Document 4] WO2002/092696A

DISCLOSURE OF THE INVENTION

Problems to be Solved by the Invention

It is therefore an object of the present invention to provide a polylactic acid composition having excellent properties (e.g., flexibility and heat resistance), and prominent mechanical properties (e.g., impact resistance and toughness) while maintaining the inherent transparency and biodegradability, and a molded product comprising the polylactic acid composition.

An another object of the present invention is to provide a polylactic acid composition having excellent properties (e.g., moldability, thermal adhesiveness, and moisture permeability) and a suppressed bleed out of the components, and a molded product comprising the polylactic acid composition.

A further object of the present invention is to provide a polylactic acid composition having an excellent mechanical property such as flex fatigue resistance and a reduced sticky texture, and a molded product comprising the polylactic acid composition.

Still another object of the present invention is to provide a polylactic acid composition exhibiting a low stress whitening and having a great dynamical strength, and a molded product comprising the polylactic acid composition.

Means to Solve the Problems

The inventors of the present invention made intensive studies to achieve the above objects and finally found that a combination use of a polylactic acid-series resin and a specific acrylic triblock copolymer produces a polylactic acid composition having excellent properties (such as flexibility and heat resistance) and prominent mechanical properties (such as impact resistance and toughness) while maintaining the inherent transparency and biodegradability. The present invention is based on the above findings.

That is the polylactic acid composition of the present invention is a polylactic acid composition comprising (A) a polylactic acid-series resin and (B) an acrylic triblock copolymer, which fulfills the following requirements (1) to (4):

(1) (P) a parameter represented by the following formula (1) is in the range of 0.05 to 10:

$$P=(\eta_A/\eta_B)\times(\phi_B/\phi_A) \quad (1)$$

wherein $\eta_A$ is a melt viscosity (Pa·s) of the polylactic acid-series resin (A) at a temperature of 200° C. and a shear rate of 100 sec$^{-1}$, $\eta_B$ is a melt viscosity (Pa·s) of the acrylic triblock copolymer (B) at a temperature of 200° C. and a shear rate of 100 sec$^{-1}$ $\phi_A$ is a volume fraction (%) (25° C.) of the polylactic acid-series resin (A) relative to the total volume of the polylactic acid-series resin (A) and the acrylic triblock copolymer (B), and $\phi_B$ is a volume fraction (%) (25° C.) of the acrylic triblock copolymer (B) relative to the total volume of the polylactic acid-series resin (A) and the acrylic triblock copolymer (B), (2) the acrylic triblock copolymer (B) comprises (B1) a polymer block having a glass-transition temperature of not higher than 25° C., (B2a) a polymer block which has a glass-transition temperature of not lower than 60° C. and is bound to a terminal of the polymer block (B1), and (B2b) a polymer block which has a glass-transition temperature of not lower than 60° C. and is bound to another terminal of the polymer block (B1), (3) the polymer block (B1) contains a unit derived from an acrylic ester as a main structural unit, and the polymer block (B2a) and the polymer block (B2b) independently contain a unit derived from an methacrylic ester unit as a main structural unit, and (4) both of the weight-average molecular weights of the polymer block (B2a) and the polymer block (B2b) are smaller than the weight-average molecular weight of the polymer block (B1).

The molecular weight distribution of the acrylic triblock copolymer (B) may be in the range of 1 to 1.4. The above-mentioned acrylic triblock copolymer (B) may be a polymer obtainable by an anionic polymerization or an atom transfer radical polymerization. The acrylic triblock copolymer (B) may be a polymer which is obtainable by an anionic polymerization in the presence of an organoaluminum compound, and substantially free from a halogen atom. The acrylic triblock copolymer (B) may comprise (BX) an acrylic triblock copolymer comprising the polymer block (B1) in an amount of 65 to 85% by mass and (BY) an acrylic triblock copolymer comprising the polymer block (B1) in an amount of 40 to 60% by mass, and the proportion (mass ratio) of the acrylic triblock copolymer (BX) relative to that of the acrylic triblock copolymer (BY) may be about 97:3 to 3:97. The molecular weight of the polymer block (B2a) may be larger than that of the polymer block (B2b), and the proportion (molecular weight ratio) of the molecular weight of the polymer block (B2a) relative to that of the polymer block (B2b) may be about 1.2 to 8.

The proportion (mass ratio) of the polylactic acid-series resin (A) relative to the acrylic triblock copolymer (B) may be about 97:3 to 40:60. The melt viscosity ratio ($\eta_A/\eta_B$) (at a temperature of 200° C. and a shear rate of 100 sec$^{-1}$) of the polylactic acid-series resin (A) relative to the acrylic triblock copolymer (B) may be about 0.1 to 10. The polylactic acid composition may have a phase separation structure having a phase comprising the polylactic acid-series resin (A) and a phase comprising the acrylic triblock copolymer (B), for example, a phase separation structure selected from the group consisting of the following (I) to (III).

(I) a micro-phase separation structure having a matrix comprising the acrylic triblock copolymer (B) and a micro-dispersed phase comprising the polylactic acid-series resin (A) and dispersed in the matrix, in which the mean diameter of the micro-dispersed phase is not more than 500 nm and the mean distance between the micro-dispersed phases is not more than 100 nm;

(II) a co-continuous structure having a continuous phase comprising the polylactic acid-series resin (A) and a continuous phase comprising the acrylic triblock copolymer (B), in which the mean thickness in the width direction of the continuous phase comprising the acrylic triblock copolymer (B) is not more than 100 nm; and (III) a micro-phase separation structure having a matrix comprising the polylactic acid-series resin (A) and a micro-dispersed phase comprising the acrylic triblock copolymer (B) and dispersed in the matrix, in which the mean diameter of the dispersed phase is not more than 300 nm.

The polylactic acid composition of the present invention may have the phase separation structure (I), in which the proportion (mass ratio) of the polylactic acid-series resin (A) relative to the acrylic triblock copolymer (B) [the polylactic acid-series resin (A): the acrylic triblock copolymer (B)] may be about 75:25 to 40:60, and the parameter (P) represented by the formula (1) may be in the range of about 1.7 to 10.

The polylactic acid composition of the present invention may have the phase separation structure (II), in which the proportion (mass ratio) of the polylactic acid-series resin (A) relative to the acrylic triblock copolymer (B) [the polylactic acid-series resin (A): the acrylic triblock copolymer (B)] may be about 75:25 to 40:60, the parameter (P) represented by the formula (1) may be about 0.05 to 1.7, and the proportion of the polymer block (B1) in the acrylic triblock copolymer (B) may be about 25 to 65% by mass.

The polylactic acid composition of the present invention may have the phase separation structure (III), in which the proportion (mass ratio) of the polylactic acid-series resin (A) relative to the acrylic triblock copolymer (B) [the polylactic acid-series resin (A): the acrylic triblock copolymer (B)] may be about 97:3 to 75:25, the parameter (P) represented by the formula (1) may be about 0.05 to 1.7, and the proportion of the polymer block (B1) in the triblock copolymer (B) may be more than 65% by mass.

The present invention includes a molded product comprising the polylactic acid composition of the present invention (e.g., a molded product having a three-dimensional form, a fiber, and a film).

The present invention includes an adhesive film, which comprises a substrate film comprising the polylactic acid composition and an adhesive layer formed on the substrate film. The film may be a co-extrusion molded film comprising the substrate film and the adhesive layer. The adhesive layer may comprise an adhesive agent containing an acrylic block copolymer.

The present invention includes a tarpaulin comprising a cloth substrate and a layer which comprises the polylactic acid composition and is formed on at least one of the surface of the cloth substrate. The cloth substrate may comprise a polylactic acid-series fiber.

The present invention includes a composite molded product, which is obtainable by composite molding the polylactic acid composition and at least one polar resin selected from the group consisting of a polyamide-series resin, a polyester-series resin, a polycarbonate-series resin, a styrenic resin, an acrylic resin, and a polylactic acid-series resin. The polar resin may be the polylactic acid-series resin.

Effects of the Invention

The present invention can provide a polylactic acid composition having excellent properties (such as flexibility and heat resistance) and high mechanical properties (such as impact resistance and toughness) while maintaining the inherent transparency of the polylactic acid, and a molded product formed from the polylactic acid composition. In particular, since the polylactic acid composition contains the polylactic acid, which is biodegradable, as a main component, when the spent polylactic acid composition or the molded product thereof is left in a natural environment, buried in soil, or the like, the polylactic acid composition or the molded product thereof gradually decomposes, global environment is not harmed. Further, since the carbon dioxide generated by the incineration of the spent polylactic acid is used (absorbed) by a plant, which is a raw material for the polylactic acid, at photosynthesis, the whole quantity of carbon dioxide in the air is the same after all. Accordingly, the composition or the molded product is very ecologically friendly.

Moreover, the composition and the molded product have excellent properties (such as moldability, thermal adhesiveness, and moisture permeability) and a suppressed bleed out of the component. In addition, the composition and the molded product have mechanical properties (such as flex fatigue resistance), a reduced sticky texture, particularly, show low stress whiting, and have high dynamical strength.

The polylactic acid composition of the present invention can be formed into various molded products having a three-dimensional form, a molded product such as a fiber or a film (e.g., an adhesive film, a tarpaulin, and a composite molded product). Making use of the above-mentioned properties, the polylactic acid composition is effectively used for several applications, for example, an agricultural material, a gardening material, a fishing material, a civil engineering and construction material, apart for automobile, an electric or electronic part, a commodity, a medical material, a writing material, a cloth, a fiber material for advertising such as a bunting (or a drop curtain) or a flag, a general merchandise such as a tent, a bag or a table cloth, a buffer (or a cushioning) material, a heat insulating material, and a protective film.

DETAILED DESCRIPTION OF THE INVENTION

Figure 1:
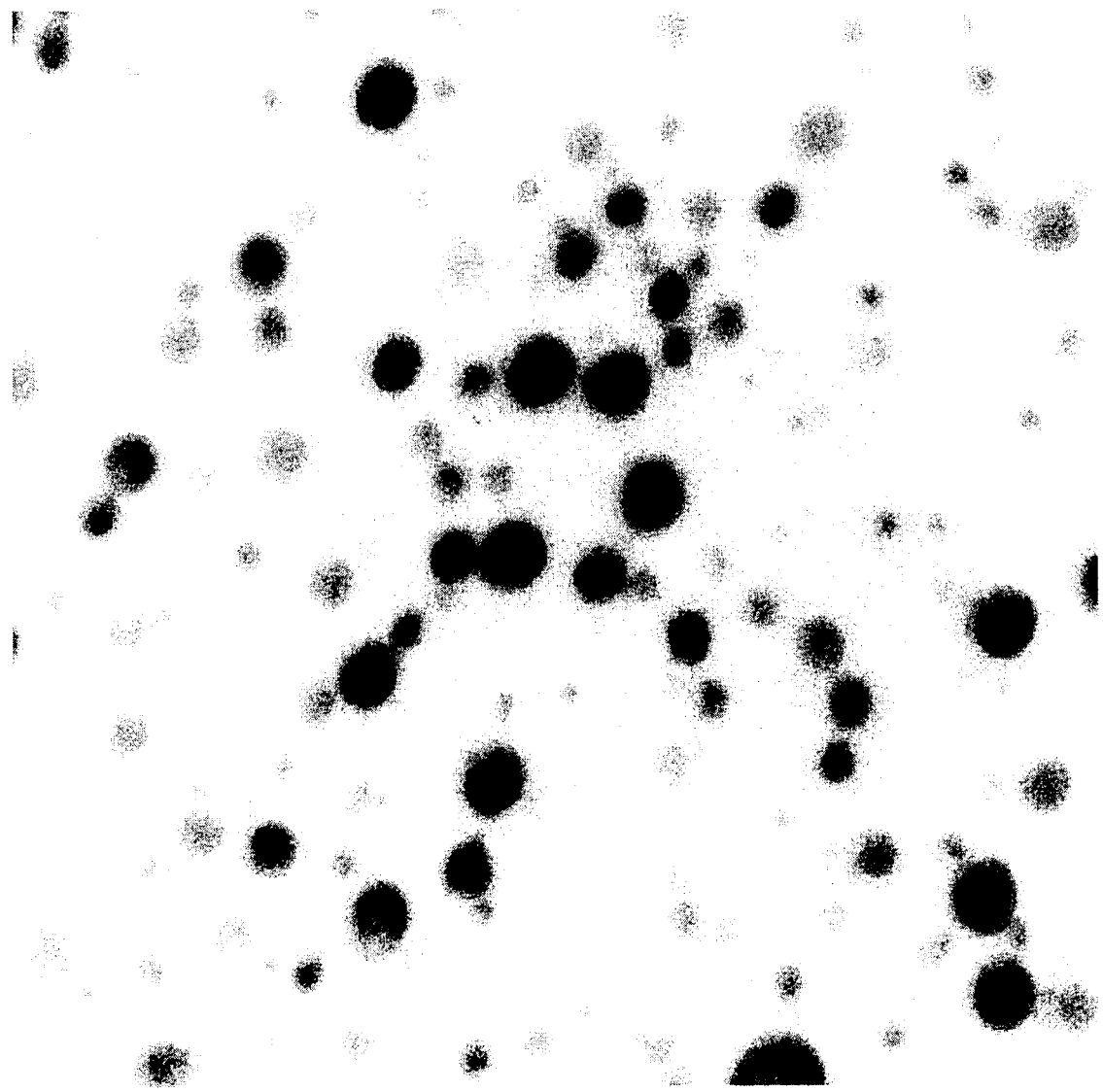
FIG. 1 is an electron micrograph showing a morphology of the polylactic acid composition obtained in Example 1.

Hereinafter, the present invention will be illustrated in more detail. The polylactic acid composition of the present invention comprises (A) a polylactic acid-series resin and (B) an acrylic triblock copolymer.

(A) Polylactic Acid-Series Resin

The polylactic acid-series resin (A) contains at least lactic acid as a main constitutional unit. Lactic acid exists in the form of L-lactic acid, D-lactic acid, or a mixture (racemic modification) of L-lactic acid and D-lactic acid. The polylactic acid-series resin (A) used for the present invention is at least a polylactic acid-series resin comprising a main constitutional unit derived from either L-lactic acid or D-lactic acid, or both of L-lactic acid and D-lactic acid.

When a lactic acid has a low optical purity is used to produce a polylactic acid-series resin, the polylactic acid-series resin has a low crystallinity, whereby the polylactic acid-series resin tends to have a poor heat resistance, mechanical property, or the like. It is preferable to use a polylactic acid-series resin obtainable from a lactic acid having a high optical purity as a raw material in order to improve the heat resistance, mechanical properties, or the like of the polylactic acid composition and the molded product of the present invention. In particular, it is preferable to use a polylactic acid-series resin obtainable from a lactic acid containing either L-lactic acid or D-lactic acid in an amount of not less than 80% by mass (for example, 80 to 100% by mass), preferably not less than 90% by mass (for example, 90 to 99.99% by mass), and more preferably not less than 95% by mass (for example, 95 to 99.9% by mass), as a raw material (a poly(L-lactic acid)-series resin or a poly(D-lactic acid)-series resin)

Furthermore, to produce a polylactic acid-series resin having a high crystallinity, a lactic acid whose optical purity of L-form is high is preferably used for the synthesis of the polylactic acid-series resin. That is, in the polylactic acid resins, the preferred polylactic acid is a polylactic acid comprising L-form as a main component and, in order to enhance the crystallinity of the polylactic acid-series resin, comprising D-form in an specific amount of, for example, not more than 15% by mass (for example, about 0 to 15% by mass, preferably about 0.01 to 10% by mass, and more preferably about 0.1 to 5% by mass).

On the other hand, a mixture of a poly(L-lactic acid) (PLLA) and a poly(D-lactic acid) (PDLA) having a mass ratio of the PLLA relative to the PDLA of about 50/50 forms a stereocomplex, which favorably improves the heat resistance of the polylactic acid-series resin. In specific, the mass ratio of the PLLA relative to the PDLA in the mixture is, for example, about 40/60 to 60/40, particularly about 45/55 to 55/45. Incidentally, the poly(L-lactic acid) contains L-form as a main component and the poly(D-lactic acid) contains D-form as a main component.

Furthermore, the polylactic acid having an excessively large amount of D-form tends to have a lower crystallinity, which consequently improves the transparency. In addition, an amorphous polylactic acid-series resin has an excellent adhesiveness and is suitable for laminate sealing. Therefore, such a polylactic acid-series resin is suitably used for applications such as a tarpaulin and a composite molded product.

The amount of L- or D-form in the polylactic acid-series resin may be measured by using a gas chromatography or the like.

In addition, since the lactic acid is obtainable by fermenting a starch derived from corn or tubers (or corms), which is a non-petroleum raw material, the lactic acid is an excellent material for protecting environment.

The proportion of the lactic acid as a constitutional unit relative to the all constitutional units in the polylactic acid-series resin is at least, for example, not less than 50 mol %. In specific, the proportion may be preferably about 80 to 100 mol % (for example, about 80 to 99.9 mol %) and more preferably about 90 to 100 mol % (particularly about 95 to 100 mol %). The polylactic acid-series resin can contain other constitutional units according to need as long as the advantages of the present invention are not deteriorated.

The other constitutional units may include a monomer copolymerizable with lactic acid, for example, a hydroxycarboxylic acid other than lactic acid (e.g., an aliphatic $C_{2-6}$hydroxycarboxylic acid such as glycolic acid, hydroxypropionic acid, hydroxybutyric acid, hydroxyvaleric acid, hydroxycaproic acid, or malic acid and an aromatic hydroxycarboxylic acid such as hydroxybenzoic acid), a diol (e.g., a $C_{2-10}$alkanediol such as ethylene glycol, propylene glycol, butanediol, heptanediol, hexanediol, octanediol, nonanediol, decanediol, or neopentyl glycol, a $C_{4-10}$cycloalkanediol such as 1,4-cyclohexanedimethanol, a $C_{3-10}$polyol such as glycerin, pentaerythritol, or sugar, a bisphenol compound such as bisphenol A, an ethylene oxide adduct of a bisphenol compound such as bisphenol A, and a poly$C_{2-4}$alkylene glycol such as a polyethylene glycol, a polypropylene glycol, or a polytetramethylene glycol), a dicarboxylic acid (e.g., an aliphatic $C_{2-12}$dicarboxylic acid such as oxalic acid, adipic acid, malonic acid, glutaric acid, azelaic acid, sebacic acid, or dodecanedicarboxylic acid, an aromatic $C_{8-12}$dicarboxylic acid such as terephthalic acid, isophthalic acid, phthalic acid, naphthalenedicarboxylic acid, bis(p-carboxyphenyl)methane, anthracenedicarboxylic acid, 4,4'-diphenyletherdicarboxylic acid, sodium 5-sulfoisophthalate, or 5-tetrabutylphosphoniumisophthalic acid, and an alicyclic dicarboxylic acid such as cyclohexanedicarboxylic acid), and a lactone (e.g., a $C_{4-12}$lactone such as caprolactone, valerolactone, propiolactone, butyrolactone, pivalolactone, undecalactone, and 1,5-oxepan-2-one). These copolymerizable monomers may be used singly or in combination in amount of about 0 to 50 mol % (preferably about 1 to 30 mol % and more preferably about 5 to 20 mol %). The polylactic acid which is usually used as the polylactic acid-series resin is a homopolymer of lactic acid due to the wide availability thereof.

The polylactic acid-series resin (A) may have a free hydroxyl group and/or a carboxyl group at a terminal. These free functional groups may be capped with a capping agent (e.g., a carbodiimide compound).

The molecular weight of the polylactic acid-series resin (A) is not particularly limited to a specific one, and an appropriate molecular weight is selected according to the applications of the polylactic acid composition. The weight-average molecular weight is usually about 50,000 to 400,000, preferably about 100,000 to 300,000, and more preferably 150,000 to 250,000. A polylactic acid-series resin (A) having a molecular weight within the above-range improves the moldability of the polylactic acid composition and the mechanical properties, heat resistance, flexibility, or the like of the molded product obtainable from the polylactic acid composition. Furthermore, such a polylactic acid-series resin (A) can easily form a phase separation structure with the acrylic triblock copolymer (B).

The melting point of the polylactic acid-series resin (A) depends on the molecular weight, the stereoregularity, the existence of the other copolymer units, the copolymerization degree, or the like and is, for example, about 95 to 230° C., preferably about 110 to 200° C., and more preferably about 125 to 175° C. (particularly, about 150 to 175° C.). It is preferable to use a polylactic acid-series resin (A) having a melting point within the range since such a polylactic acid-series resin favorably improves the moldability of the polylactic acid composition and the mechanical properties, heat resistance, moldability, or the like of the molded product obtainable from the polylactic acid composition. In addition such a polylactic acid-series resin has a wide availability.

The melt viscosity (a melt viscosity at a temperature of 200° C. and a shear rate of 100 second$^{-1}$) of the polylactic acid-series resin (A) is, for example, about 10 to 2000 Pa·s, preferably about 50 to 1800 Pa·s, and more preferably about 100 to 1600 Pa·s (particularly about 150 to 1500 Pa·s). A polylactic acid-series resin (A) having a melt viscosity within the above-mentioned range favorably forms a micro-phase separation structure or a co-continuous structure of the polylactic acid composition, which improves the mechanical properties, the heat resistance, or the like of the composition.

The specific gravity (at 25° C.) of the polylactic acid-series resin (A) is, for example, about 1.1 to 1.5, preferably about 1.15 to 1.4, and more preferably about 1.2 to 1.3.

(B) Acrylic Triblock Copolymer

The acrylic triblock copolymer (B) used in the present invention comprises (B1) a polymer block having a low glass-transition temperature, (B2a) a polymer block having a high glass-transition temperature located at one terminal of the polymer block (B1), and (B2b) a polymer block having a high glass-transition temperature located at another terminal of the polymer block (B1).

The polymer block (B1) at least comprises a soft acrylic polymer having a low glass-transition temperature (not higher than 25° C.). The polymer block (B1) may usually contain a main structural unit derived from an ester of acrylic acid. The acrylate may include, for example, an alkyl acrylate, an aryl acrylate, an ester of acrylic acid with an alcohol containing a functional group having an etheric oxygen. Theses acrylates may be used singly or in combination. Among these acrylates, an alkyl acrylate is preferred.

The alkylacrylate may include, for example, a $C_{1-12}$alkyl acrylate such as methyl acrylate, ethyl acrylate, n-propyl acrylate, isopropyl acrylate, n-butyl acrylate, isobutyl acrylate, sec-butyl acrylate, t-butyl acrylate, amyl acrylate, isoamyl acrylate, n-hexyl acrylate, 2-ethylhexyl acrylate, or lauryl acrylate. These alkyl acrylates may be used singly or in combination as a constitutional unit.

Among these alkyl acrylates, a $C_{2-8}$alkyl acrylate such as ethyl acrylate, n-butyl acrylate, or 2-ethylhexyl acrylate, particularly, a $C_{3-8}$alkyl acrylate such as n-butyl acrylate is preferably used to improve the flexibility and heat resistance of the composition.

The alkyl acrylate may be used in combination with other copolymerizable monomers as long as the advantages of the present invention are not adversely affected. The other copolymerizable monomers may include, for example, a (meth)acrylic monomer (e.g., a (meth)acrylate such as hydroxypropyl acrylate, butylmethacrylate, or glycidyl acrylate, and (meth)acrylic acid), a polymerizable nitrile compound (e.g., (meth)acrylonitrile), an unsaturated dicarboxylic acid or a derivative thereof (e.g., maleic anhydride) a vinyl ester (e.g., vinyl acetate and vinyl propionate), a conjugated diene (e.g., butadiene and isoprene), and an olefin (e.g., ethylene, propylene, and 1-butene). These copolymerizable monomers may be used singly or in combination. Among these copolymerizable monomers, a (meth)acrylic acid-series monomer, particular, an acrylate other than the above-mentioned alkyl acrylates (e.g., allyl acrylate and vinyl acrylate) is preferred. The proportion (molar ratio) of the alkyl acrylate relative to the copolymerizable monomer (the alkyl acrylate/the copolymerizable monomer) may be, for example, about 100/0 to 80/20, preferably about 99.9/0.1 to 90/10, and more preferably about 99/1 to 95/5.

The polymer block (B2a) and the polymer block (B2b), independently, at least comprise a hard methacrylic polymer having a high glass-transition temperature (not lower than 60° C.). In practice, the polymer block (B2a) and the polymer block (B2b) may independently comprise methacrylic acid or a constitutional unit derived from a methacrylate as a main unit. An alkyl methacrylate, an aryl methacrylate, an ester of methacrylic acid with an alcohol containing a functional group having an etheric oxygen may be exemplified as the methacrylate. These methacrylates may be used singly or in combination. Among these methacrylates, an alkyl methacrylate is preferred.

The alkyl methacrylate may include, for example, a $C_{1-5}$alkyl methacrylate (such as methyl methacrylate, ethyl methacrylate, isopropyl methacrylate, isobutyl methacrylate, t-butyl methacrylate, amyl methacrylate, or isoamyl methacrylate) and a $C_{5-12}$cycloalkyl methacrylate such as cyclohexyl methacrylate. These alkyl methacrylates may be used singly or in combination as a constitutional unit.

In the alkyl methacrylates, a $C_{1-5}$alkyl methacrylate is preferably used to improve the heat resistance of the polylactic acid composition or the miscibility of the acrylic triblock copolymer (B) to the polylactic acid-series resin (A), and a $C_{1-3}$alkyl methacrylate (particular, methyl methacrylate) is more preferably used for the same purpose.

The alkyl methacrylate, like the alkyl acrylate, may be used in combination with the other copolymerizable monomers (particularly, a methacrylic monomer such as allyl methacrylate, vinyl methacrylate, or methacrylic acid) as long as the advantages of the present invention are not adversely effected. The proportion of the alkyl methacrylate relative to the other copolymerizable monomers is the same as the proportion of the alkyl acrylate.

The structure of the acrylic triblock copolymer (B) is a block structure in which the polymer block (B2a) is bounded to a terminal of the polymer block (B1) and the polymer block (B2b) is bounded to another terminal thereof. In other words, the structure of the acrylic triblock copolymer (B) is a triblock structure (B2a-B1-B2b) having the polymer block (B1), which is located in the center of the structure, the polymer block (B2a) bounded to a terminal of the polymer block (B1), and the polymer block (B2b) bounded to another terminal thereof. The polymer block (B2a) and the polymer block (B2b) may comprise a different polymer in terms of the kinds or composition of the monomers as a constitutional unit. Preferably, a polymer constituting the polymer block (B2a) and a polymer constituting the polymer block (B2b) are the same or similar to each other, in order to improve the compatibilities of the block copolymers (B) to each other. In addition, it is particularly preferable that the polymer block (B2a) and the polymer block (B2b) independently comprise a $C_{1-3}$alkyl methacrylate (particular, methyl methacrylate) unit as a main unit, in order to improve the miscibility with the polylactic acid-series resin.

In the present invention, to cope with both the flexibility and the heat resistance, it is necessary that the glass-transition temperature of the polymer block (B1) be not higher than 25° C., and that the glass-transition temperatures of both of the polymer block (B2a) and the polymer block (B2b) be not lower than 60° C. A polymer block (B1) having a glass-transition temperature of higher than 25° C. makes the polylactic acid composition excessively hard. Furthermore, a polymer block (B2a) and a polymer block (B2b) independently having a glass-transition temperature of lower than 60° C. deteriorate the heat resistance of the polylactic acid composition.

In specific, the glass-transition temperature of the polymer block (B1) is preferably not higher than 0° C. (e.g., −100 to 0° C.) and more preferably −70 to −20° C. Each of the glass-transition temperatures of the polymer block (B2a) and the polymer block (B2b) is preferably not lower than 80° C. (e.g., 80 to 200° C.) and more preferably 100 to 150° C.

In the description, each of the glass-transition temperatures of the polymer blocks means a glass-transition temperature defined by the method of the temperature dependency of the dynamic viscoelasticity. The glass-transition temperature of the polymer blocks can be measured by a method described in the after-mentioned paragraph of Examples.

In the present invention, to improve the dispersibility of the acrylic triblock copolymer (B), the weight-average molecular weight of the polymer block (B1) [hereinafter, sometimes referred as "Mw(B1)"] is preferably larger than both of the weight-average molecular weight of the polymer block (B2a) [hereinafter, sometimes referred as "Mw(B2a)"] and the weight-average molecular weight of the polymer block (B2b) [hereinafter, sometimes referred as "Mw(B2b)"]. A polymer block (B1) having a Mw(B1) which is smaller than the Mw(B2a) of the polymer block (B2a) or the Mw(B2b) of the polymer block (B2b), allows the phase of the polymer block (B1) to have an excessively high compatibility with the phase of the polylactic acid-series resin (A), which fails to separate the phases sharply.

Concretely, in order to improve the compatibilities of the acrylic triblock copolymer (B) to the polylactic acid-series resin (A) and the flexibility of the polylactic acid resin, the Mw(B1) of the polymer block (B1) relative to each of the Mw(B2a) of the polymer block (B2a) and the Mw(B2b) of the polymer block (B2b) is, for example, about 1 to 50 (e.g., about 1.5 to 30), preferably about 1 to 10 (e.g., about 2 to 10), and more preferably about 3 to 9 (particularly about 4 to 8).

The total molecular weight of the acrylic triblock copolymer (B) may be selected according to the applications of the polylactic acid composition. For improving the mechanical properties of the polylactic acid composition and the molded product, preventing the bleed out of the acrylic triblock copolymer (B) from the polylactic acid composition and the molded product, and enhancing (improving) the dispersibility of the acrylic triblock copolymer (B), the total molecular weight of the acrylic triblock copolymer (B) is, for example, about 20,000 to 1,000,000, preferably about 30,000 to 500,000, and more preferably about 50,000 to 300,000.

The molecular weight distribution of the acrylic triblock copolymer (B) [the ratio of the weight-average molecular weight (Mw) relative to the number-average molecular weight (Mn) (Mw/Mn)] may be, for example, about 1.0 to 1.4, preferably about 1.0 to 1.3, and more preferably about 1.0 to 1.25 (particularly, about 1.01 to 1.25). An acrylic triblock copolymer (B) having a molecular weight distribution within the range only contains a small amount of a volatile component such as a residual monomer, which reduces a contaminant or odor at molding process.

Moreover, when the weight-average molecular weight [Mw(B1)] of the polymer block (B1) fulfills the above-mentioned requirement that the Mw(B1) is larger than each of the weight-average molecular weight Mw(B2a) of the polymer block (B2a) and the weight-average molecular weight Mw (B2b) of the polymer block (B2b) the weight-average molecular weight Mw(B1) may be, for example, about 10,000 to 200,000, preferably about 20,000 to 150,000, and more preferably about 30,000 to 100,000. In addition, when the weight-average molecular weight [Mw(B1)] of the polymer block (B1) fulfills the above-mentioned requirement, the Mw(B2a) and the Mw(B2b) may independently be, for example, about 3,000 to 30,000, preferably about 5,000 to 20,000, and more preferably about 6,000 to 15,000.

Furthermore, the weight-average molecular weight [Mw (B2a)] of the polymer block (B2a) and the weight-average molecular weight [Mw(B2b)] of the polymer block (B2b) may be the same (or almost the same) or different. The molecular weights of the polymer block (B2a) and (B2b) are preferably the same or almost the same in order to improve the compatibilities of the acrylic triblock copolymers (B) to each other. However, it is more preferable that the polymer blocks (B2a) and (B2b) be different in molecular weight. Such polymer blocks favorably enhance the compatibility of the acrylic triblock copolymer (B) for the polylactic acid-series resin, which ensures both the toughness and the flexibility of the composition.

That is, it is preferable that in the acrylic triblock copolymer (B), the polymer block (B2a) and the polymer block (B2b) be different in molecular weight and asymmetric. In specific, when the molecular weight of the polymer block (B2a) is larger than that of the polymer block (B2b), the proportion (molecular weight ratio) of the molecular weight of the polymer block (B2a) relative to that of the polymer block (B2b) (hereinafter, the proportion is sometimes referred as the degree of asymmetricity) [the polymer block (B2a)/the polymer block (B2b)] is, for example, about 1.2 to 8, preferably about 1.2 to 5, more preferably about 1.2 to 3. An asymmetric triblock copolymer having a ratio of molecular weight of the polymer block (B2a) relative to that of the polymer block (B2b) within the range has a higher compatibility with the polylactic acid-series resin (A), and the interfacial adhesive strength between the resins is enhanced to impart both toughness and flexibility to the composition and the molded product. On the one hand, a triblock copolymer (B) having an excessively large ratio of the molecular weight of the polymer block (B2a) relative to that of the polymer block (B2b) imparts an excellent toughness to the composition and the molded product. However, the flexibility is not improved. In addition, the texture tends to become sticky. On the other hand, a triblock copolymer (B) having an excessively small ratio of the molecular weight of the polymer block (B2a) relative to that of the polymer block (B2b) sometimes fails to improve the toughness of the composition and the molded product, as well as a symmetric triblock copolymer whose ratio of the molecular weight of the polymer block (B2a) relative to that of the polymer block (B2b) is about 1.

Incidentally, in the description, the weight-average molecular weights and the number-average molecular weights of the acrylic triblock copolymer (B), the polymer block (B1), the polymer block (B2a), and the polymer block (B2b) independently mean the weight-average molecular weight and the number-average molecular weight measured by a gel permeation chromatography (hereinafter, referred as "GPC") using a polystyrene as a standard substance, and can be measured by the method described in Examples.

Moreover, when it is difficult to define the weight-average molecular weights (Mw) of the polymer blocks (B1) and (B2b) in the (B2a)-(B1)-(B2b) triblock copolymer synthesized by sequential polymerization of the polymer blocks in the order of (B2a), (B1), and (B2b), the weight-average molecular weights are calculated from the mass ratio of each block, based on the weight-average molecular weight of the polymer block (B2a). That is, the weight-average molecular weight Mw(B1) of the polymer block (B1) is calculated from the following formula:

Mw(*B*1)=Mw(*B*2*a*)×(the mass ratio of *B*1/the mass ratio of *B*2*a*);

and the weight-average molecular weight Mw(B2b) of the polymer block (B2b) is calculated from the following formula:

Mw(*B*2*b*)=Mw(*B*2*a*)×(the mass ratio of *B*2*b*/the mass ratio of *B*2*a*).

Moreover, the proportion of the polymer block (B1) relative to the total amount of the polymer block (B2a) and polymer block (B2b) in the acrylic triblock copolymer (B) may be adjusted according to the application, the molding process, or the like of the polylactic acid composition. To disperse the polylactic acid-series resin (A) or the acrylic triblock copolymer (B) finely (a dispersed phase), the proportion of the polymer block (B1) relative to the total mass of the acrylic triblock copolymer (B) is usually, for example, not less than 40% by mass [that is, the total amount of the polymer block (B2a) and the polymer block (B2b) is not more than 60% by mass], preferably about 50 to 90% by mass, and more preferably about 60 to 90% by mass (particular, about 65 to 85% by mass). In particular, to form a micro-phase separation structure having a dispersed phase comprising the acrylic triblock copolymer (B), the proportion of the polymer block (B1) is preferably higher than 65% by mass.

On the other hand, to form the co-continuous phase structure having a phase comprising the polylactic acid-series resin (A) and a phase comprising the acrylic triblock copolymer (B), the proportion of the polymer block (B1) relative to the total amount of the acrylic triblock copolymer (B) is, for example, about 25 to 80% by mass (e.g., about 25 to 65% by mass), preferably about 40 to 80% by mass, and more preferably 40 to 70% by mass (particularly about 40 to 60% by mass).

In particular, in the present invention, the acrylic triblock copolymer (B) comprising a combination of (BX) an acrylic triblock copolymer and (BY) an acrylic triblock copolymer, both of which have the following proportion of the polymer block (B1) relative to the total amount of the acrylic triblock copolymer (B), imparts a resistance to stress whitening caused at a bending or drawing deformation and a higher transparency to a polylactic acid composition or a molded product thereof. The acrylic triblock copolymer (BX) comprises the polymer block (B1) in an amount of about 60 to 90% by mass (preferably about 65 to 85% by mass, more preferably about 65 to 80% by mass, and particularly about 65 to 75% by mass) and an acrylic triblock copolymer (BY) comprises the polymer block (B1) in an amount of about 35 to 60% by mass (preferably about 40 to 60% by mass, more preferably 40 to 55% by mass, and particularly about 40 to 50% by mass).

Further, in such a combination, the use of at least one of the acrylic triblock copolymers (BX) and (BY) having the following weight-average molecular weight ratio in terms of either the polymer block (B2a) or the polymer block (B2b), which has a smaller weight-average molecular weight than another, imparts a great resistance to stress whitening at a deformation to the polylactic acid, and an excellent transparency to the polylactic acid: in terms of either the polymer block (B2a) or the polymer block (B2b), the weight-average molecular weight ratio of the polymer block having a larger weight-average molecular weight relative to the polymer block having a smaller weight-average molecular weight is, about 1.2 to 8 (preferably about 1.2 to 5, more preferably about 1.2 to 3). In particular, the acrylic triblock copolymer (BY) is preferably asymmetric. It is particularly preferable that the acrylic triblock copolymer (BY) be asymmetric and the acrylic triblock copolymer (BX) be symmetric (the rate of the weight-average molecular weight of the above-mentioned polymer block is, for example, about 0.8 to 1.2, preferably about 0.85 to 1.15, and more preferably about 0.9 to 1.1). The reason for that is assumed that the acrylic triblock copolymer (BY) having a compatibility with both the polylactic acid-series resin (A) and the acrylic triblock copolymer (BX), enhances the interfacial adhesive strength between the polylactic acid-series resin (A) and the acrylic triblock copolymer (B), which prevents the formation of void caused at bending deformation or drawing (or stretching) deformation.

To realize the above-mentioned advantages, the proportion (mass ratio) of the acrylic triblock copolymer (BX) relative to the acrylic triblock copolymer (BY) in the acrylic triblock copolymer (B) [the acrylic triblock copolymer (BX): the acrylic triblock copolymer (BY)] is, for example, about 97:3 to 3:97, preferably about 90:10 to 10:90, and more preferably about 70:30 to 30:70.

The melt viscosity of the acrylic triblock copolymer (B) (a melt viscosity at a temperature of 200° C. and a shear rate of 100 sec$^{-1}$) is, for example, about 10 to 2000 Pa·s, preferably about 50 to 1800 Pa·s, and more preferably about 100 to 1500 Pa·s.

In the present invention, especially, the melt viscosity ratio of the polylactic acid-series resin (A) relative to the acrylic triblock copolymer (B) ($\eta_A/\eta_B$) (at a temperature of 200° C. and a shear rate of 100 sec$^{-1}$) is, about 0.1 to 10, preferably about 0.2 to 8, and more preferably about 0.3 to 5 (e.g., about 0.5 to 2). A melt viscosity ratio within the above-mentioned range allows the polylactic acid-series resin (A) and the acrylic triblock copolymer (B) to form a micro-phase separation structure or co-continuous structure easily, which improves the mechanical properties, heat resistance, or the like of the composition.

The acrylic triblock copolymer (B) used in the present invention is produced by a conventional known method, which is not particularly limited to a specific one. In particular, to obtain a polymer having a narrow molecular weight distribution, a method by an anionic polymerization or an atom transfer radical polymerization (particularly an anionic polymerization) is preferably used. In addition, to obtain a highly pure polymer, to manipulate the molecular weight or the composition ratio easily, and to save the production cost, an anionic polymerization in the presence of an organoaluminum compound is particularly preferred. The triblock copolymer obtainable by such a method is substantially free from halogen atom and has an excellent heat resistance and weather resistance (discoloration resistance).

The method for producing the acrylic triblock copolymer (B) by the atom transfer radical polymerization may include, a method comprising a polymerization which uses an organo halogen compound, a halogenated sulfonyl compound, or the like as an initiator in the presence of a transition metal compound or a nitrogen-containing compound. In the above-mentioned compound, the preferred initiator includes an organohalogen compound. In particular, a compound having a halogen atom bound to benzyl position or to α-position of a carbonyl group is preferably used as the initiator.

The preferred method for producing the acrylic triblock copolymer (B) comprising the anionic polymerization in the presence of an organoaluminum compound includes, for example, as follows.

That is, the method for producing the acrylic triblock copolymer (B) comprises (i) an anionic polymerizing an acrylic monomer (particularly, a methacrylate) in the presence of a polymerization initiator and an organoaluminum compound in an inert organic solvent to form a polymethacrylate for the polymer block (B2a), (ii) supplying an acrylic monomer (particularly, an acrylate) into the polymerization system to form a diblock copolymer having the polymer block (B2a) (particularly, a polymethacrylate) and a polymer block (B1) bound to the polymer block (B2a), by an anionic polymerization, and (iii) supplying an acrylic monomer (particularly, a methacrylate) into the polymerization system to produce an acrylic triblock copolymer (B) [a triblock copolymer represented by the formula (B2a)-(B1)-(B2b)] having the diblock copolymer and a polymer block (B2b) (particularly, a polymethacrylate) bounded to another terminal of the polymer block (B1) of the diblock copolymer.

The inert organic solvent for such an anionic polymerization may include a hydrocarbon solvent (e.g., toluene, benzene, and xylene) a halogenated hydrocarbon solvent (e.g., chloroform, methylene chloride, and carbon tetrachloride), and an ether-series solvent (e.g., tetrahydrofuran and diethyl ether). These solvents may be used singly or as a mixed solvent containing two or more solvents. Among these solvents, a nonpolar solvent (e.g., an aromatic hydrocarbon such as toluene) is commonly used.

Further, the polymerization initiator may include, for example, an anionic polymerization initiator [e.g., an organoalkali metal compound (such as an organolithium compound, an organosodium compound, or an organopotassium compound) and an organoalkaline earth metal compound (such as an organomagnesium compound)]. These polymerization initiators may be used singly or in combination. In the polymerization initiators, the preferred one is an alkyllithium because of the solubility of the alkyllithium in the nonpolar solvent. Examples of the alkyllithium may include a $C_{1-6}$alkyllithium such as methyllithium, ethyllithium, n-propyllithium, isopropyllithium, n-butyllithium, s-butyllithium, isobutyllithium, t-butyllithium, n-pentyllithium, or n-hexyllithium.

The amount of the polymerization initiator relative to 1 mole of the total acrylic monomer constituting the acrylic triblock copolymer (B) is, for example, about 0.0001 to 0.1 mole, preferably about 0.0005 to 0.01 mole, and more preferably about 0.001 to 0.005 mole.

The organoaluminum compound is used to improve (or enhance) the living character of the polymerization of an acrylic monomer such as a methacrylate or an acrylate during the polymerization. The typical example of the organoaluminum compound includes an organoaluminum compound represented by the following formula;

$AlR^1R^2R^3$ wherein, $R^1$, $R^2$ and $R^3$ are independently an alkyl group which may have a substituent, a cycloalkyl group which may have a substituent, an aryl group which may have a substituent, an aralkyl group which may have a substituent, an alkoxy group which may have a substituent, an aryloxy group which may have a substituent, or an amino group having two substituents on a nitrogen atom thereof; or $R^1$ is any one of the above-mentioned groups, and $R^2$ and $R^3$ are independently an aryleneoxy group which may have a substituent, and $R^2$ and $R^3$ are bounded to each other by an alkylene group.

Concrete example of the organoaluminum compound represented by the above-mentioned formula may include a trialkylaluminum (e.g., trimethylaluminum, triethylaluminum, triisobutylaluminum, and trihexylaluminum), a dialkylaryloxyaluminum [e.g., diethyl(2,6-di-t-butylphenoxy)aluminum, diisobutyl(2,6-di-t-butyl-4-methylphenoxy)aluminum, and di-n-octyl(2,6-di-t-butyl-4-methylphenoxy)aluminum], an alkyldiaryloxyaluminum [e.g., isobutylbis(2,6-di-t-butylphenoxy)aluminum, isobutylbis(2,6-di-t-butyl-4-methylphenoxy)aluminum, and n-octylbis(2,6-di-t-butyl-4-methylphenoxy)aluminum], an alkoxydiaryloxyaluminum [e.g., methoxybis(2,6-di-t-butyl-4-methylphenoxy)aluminum, isopropoxybis(2,6-di-t-butyl-4-methylphenoxy)aluminum, and t-butoxybis(2,6-di-t-butyl-4-methylphenoxy)aluminum], a triaryloxyaluminum [e.g., tris(2,6-di-t-butyl-4-methylphenoxy)aluminum], and an alkyl(methylenebisaryloxy)aluminum {e.g., ethyl[2,2'-methylenebis(4-methyl-6-t-butylphenoxy)]aluminum and isobutyl[2,2'-methylenebis(4-methyl-6-t-butylphenoxy)]aluminum}. These organoaluminum compounds may be used singly or in combination. In the organoaluminum compounds, an aluminum compound having an aryloxy group, particularly, a $C_{1-10}$alkyldiaryloxyaluminum which may have a substituent [such as isobutylbis(2,6-di-t-butyl-4-methylphenoxy)aluminum] is preferred.

The amount of the organoaluminum compound, for example, relative to 1 mole of the total acrylic monomer constituting the acrylic triblock copolymer (B) is, for example, about 0.0001 to 0.1 mole, preferably about 0.0005 to 0.01 mole, and more preferably about 0.001 to 0.005 mole.

In the production of the acrylic triblock copolymer (B), according to need, an additive for accelerating the polymerization with maintaining the high living character of the polymerization may further be added to the polymerization system. Concrete examples of such an additive may include an ether compound (e.g., dimethyl ether, dimethoxyethane, diethoxyethane, and 12-crown-4), an organonitrogen compound (e.g., triethylamine, N,N,N',N'-tetramethylethylenediamine, N,N,N',N'',N''-pentamethyldiethyltriamine, 1,1,4,7,10,10-hexamethyltriethylenetriamine, pyridine, and 2,2'-dipyrydyl), an organophosphrous compound [e.g., triethylphosphine, triphenylphosphine, and 1,2-bis(diphenylphosphino)ethane], an inorganic salt (e.g., lithium chloride, sodium chloride, and potassium chloride), a metal alkoxide [e.g., lithium (2-methoxyethoxy)ethoxide and potassium t-butoxide], and a quaternary ammonium salt or a quaternary phosphonium salt (e.g., tetraethylammonium chloride, tetraethylammonium bromide, tetraethylphosphonium chloride, and tetraethylphosphoniumbromide). These additives may be used singly or in combination. Among these additives, in order to prompt the polymerization with maintaining the high living character of the polymerization by using a small amount of the additive, an ether compound, an organonitrogen compound, particularly, an aliphatic ether compound such as 1,2-dimethoxyethane is preferred.

The amount of the additive relative to 1 mole of the total acrylic monomer constituting the acrylic triblock copolymer (B) is, for example, about 0.0001 to 5 mole, preferably about 0.0005 to 1 mole, and more preferably about 0.001 to 0.5 mole.

[Polylactic Acid Composition]

The polylactic acid composition of the present invention has a phase separation structure comprising a phase comprising the polylactic acid-series resin (A) and a phase comprising the acrylic triblock copolymer (B). The phase separation structure is not limited to a specific one and simply categorized in the three following morphologies. (I) a micro-phase separation structure having a micro-dispersed phase comprising the polylactic acid-series resin (A) in a matrix comprising the acrylic triblock copolymer (B); (II) a co-continuous structure having a continuous phase comprising the polylactic acid-series resin (A) and a continuous phase comprising the acrylic triblock copolymer (B); and (III) a micro-phase separation structure having a micro-dispersed phase comprising the acrylic triblock copolymer (B) in a matrix comprising the polylactic acid-series resin (A).

In the micro-phase separation structure (I), the mean diameter of the dispersed phase comprising the polylactic acid-series resin (A) is, for example, not more than 500 nm (e.g., about 10 to 500 nm), preferably about 50 to 450 nm, and more preferably about 100 to 400 nm. The particle size distribution of the dispersed phase comprising the polylactic acid-series resin (A) based on the total number of the dispersed phases is usually as follows: about 0 to 30% of the dispersed phases have a particle size within the range of 400 to 500 nm; about 10 to 60% of the dispersed phases have a particle size of not less than 200 nm to less than 400 nm; about 10 to 60% of the dispersed phases have a particle size of not less than 100 nm to less than 200 nm; and about 5 to 40% of the dispersed phases have a particle size of less than 100 nm.

The mean distance between the dispersed phases is, for example, not more than 100 nm (e.g., about 5 to 100 nm), preferably about 10 to 80 nm, and more preferably about 20 to 70 nm.

Such a micro-phase structure imparts an excellent flexibility, moldability, and thermal adhesiveness, a superb mechanical property (such as impact resistance or stretching property), a high moisture permeability, and a suppressed bleed out of the components to the polylactic acid composition and the molded product thereof while maintaining the inherent transparency and heat resistance of the polylactic acid-series resin (A).

In the co-continuous phase structure (II), the mean thickness in the width direction (the mean diameter or the mean distance in the width direction) of the continuous phase comprising the acrylic triblock copolymer (B) is, for example, not more than 100 nm (e.g., about 5 to 100 nm), preferably about 10 to 80 nm, and more preferably about 20 to 70 nm. The thickness in the width direction of the continuous phase corresponds to the distance in the width direction of the phase comprising the acrylic triblock copolymer (B), which has a threadlike structure in observation of the structure by an electron microscope. Incidentally, in the polylactic acid composition, the continuous phase comprising the acrylic triblock copolymer (B) has a threadlike or lamellar structure to form a net-like continuous phase.

In addition to the advantages due to the above-mentioned micro-phase separation structure, such a co-continuous phase structure imparts a dynamical strength, resistance to stress whiting to the polylactic acid composition and the molded product.

In the micro-phase separation structure (III), the mean diameter of the dispersed phase comprising the acrylic triblock copolymer (B) is, for example, not more than 300 nm (e.g., about 10 to 300 nm), preferably about 30 to 250 nm, and more preferably about 50 to 200 nm. The particle size distribution of the dispersed phase comprising the acrylic triblock copolymer (B) based on the total number of the dispersed phases is usually as follows: about 10 to 20% of the dispersed phases have a particle size within the range of 200 to 300 nm; about 20 to 40% of the dispersed phases have a particle size of not less than 100 nm to less than 200 nm; and about 40 to 70% of the dispersed phases have a particle size of less than 100 nm.

Such a micro-phase structure imparts an excellent flexibility, moldability, thermal adhesiveness, and heat resistance, superb mechanical properties (such as impact resistance or stretching property) to the polylactic acid composition and the molded product while maintaining the inherent transparency of the polylactic acid-series resin (A) successfully. In addition, the bleed out of the acrylic triblock copolymer (B) from the polylactic acid composition and the molded product is reduced, and the surface thereof is less sticky.

The proportion (mass ratio) of the polylactic acid-series resin (A) relative to the acrylic triblock copolymer (B) [the polylactic acid-series resin (A): the acrylic triblock copolymer (B)] may be selected from, for example, about 99:1 to 10:90, and is, for example, about 98:2 to 30:70 and preferably about 97:3 to 40:60 (particularly, about 95:5 to 50:50).

In the present invention, the proportion may be selected according to the phase separation structures. For example, in the micro-phase separation structure (I) and the co-continuous structure (II), the proportion (mass ratio) of the polylactic acid-series resin (A) relative to the acrylic triblock copolymer (B) [the polylactic acid-series resin (A): the acrylic triblock copolymer (B)] is at least, for example, not less than 40:60 (the polylactic acid-series resin is not less than 40% by mass). In specific, it is preferable that the proportion of the polylactic acid-series resin (A) relative to the acrylic triblock copolymer (B) be, for example, about 40:60 to 80:20, preferably about 40:60 to 75:25, and more preferably about 50:50 to 75:25 (particularly, about 60:40 to 75:25).

In the micro-phase separation structure (III), the proportion (mass ratio) of the polylactic acid-series resin (A) relative to the acrylic triblock copolymer (B) [the polylactic acid-series resin (A): the acrylic triblock copolymer] may be, for example, about 97:3 to 40:60, preferably about 97:3 to 50:50 (e.g., about 97:3 to 75:25), and more preferably about 95:5 to 70:30 (particularly about 95:5 to 75:25).

Furthermore, to adhere to other molded resin articles firmly, it is usually preferable that the composition have a relatively large proportion of the acrylic triblock copolymer (B) However, to maintain the properties of the polylactic acid-series resin, it is preferable that the composition have a relatively large proportion of the polylactic acid-series resin (A). In particular, when the composition is used for the after-mentioned composite molded product or the like, in order to cope with both the adhesiveness and the properties of the polylactic acid such as the transparency or the heat resistance, the proportion (mass ratio) of the polylactic acid-series resin (A) relative to the acrylic triblock copolymer (B) [the polylactic acid-series resin (A): the acrylic triblock copolymer (B)] may be, for example, about 95:5 to 50:50, preferably about 90:10 to 60:40, and more preferably about 80:20 to 65:35.

As long as the advantages of the present invention is not deteriorated, the polylactic acid composition of the present invention may contain other polymers or additives with the polylactic acid-series resin (A) and the acrylic triblock copolymer (B) according to need.

Other polymers may include, for example, a polyolefinic resin, a vinyl alcohol-series resin, an acrylic resin, an aliphatic polyester-series resin other than the polylactic acid-series resin, polyamide-series resin, a cellulose-series resin, and a polyalkylene glycol-series resin. These polymers may be used singly or in combination. In particular, a (meth) acrylic polymer such as a poly(methyl methacrylate) or a poly(n-butyl acrylate), a synthetic rubber such as a polyacrylate rubber, a polybutene rubber, a polyisobutylene rubber, an ethylene-propylene rubber (EPR), or an ethylene-propylene-diene rubber (EPDM) is preferred. The proportion of the other polymers relative to the whole composition is, for example, not more than 30% by mass (e.g., about 0 to 30% by mass), preferably not more about 20% by mass (e.g., about 0.01 to 20% by mass), and more preferably not more than 10% by mass (e.g., about 0.1 to 10% by mass).

The additives may include conventional additives, for example, a mineral oil-based softener for improving flowability at molding (e.g., a paraffinic oil and a naphthenic oil), an inorganic filler to improve or enhance heat resistance, weather resistance, or the like (e.g., calcium carbonate, a talc, a carbon black, a titanium oxide, a silica, a clay, barium sulfate, and magnesium carbonate), an inorganic or organic fiber for reinforcement (e.g., an inorganic fiber such as a glass fiber or a carbon fiber and an organic fiber such as an aramid fiber), a stabilizer (e.g., a heat stabilizer, an antioxidant, a light stabilizer, an ultraviolet absorber, and a weatherproof agent), an adhesive agent, a tackifier, a plasticizer, a lubricant, an antistatic agent, a nucleating agent (e.g., trimesic acid tricyclohexylamide and an isoindolinone-series pigment), a hydrolysis suppressing agent (e.g., a carbodiimide-series compound), a foaming agent [e.g., azodicarbon amide, an inorganic carbonate, sodium hadrogencarbonate, 4,4-oxybis (benzsulfonylhydrazide), citric acid, and potassium hydroxide], and a coloring agent (such as a pigment or a dye). These additives may be used singly or in combination. In particular, a heat stabilizer, an antioxidant, a hydrolysis suppressing agent, or the like is preferably added to enhance the heat resistance, the weather resistance, for practical use of the polylactic acid composition.

The proportion of the additive may be selected according to the kinds of the additives. The proportion of the additive relative to the whole composition is, for example, not more than 50% by mass (e.g., about 0 to 50% by mass), preferably not more than 30% by mass (e.g., about 0.01 to 30% by mass), and more preferably not more than 10% by mass (e.g., about 0.1 to 10% by mass).

In particular, the hydrolysis suppressing agent effectively stabilizes the polylactic acid-series resin. The hydrolysis suppressing agent may be used, for example, in a proportion of about 0.05 to 5 parts by mass, preferably about 0.1 to 3 parts by mass, and more preferably about 0.3 to 2 parts by mass relative to the polylactic acid-series resin 100 parts by mass.

[Process for Producing Polylactic Acid Composition]

The process for the polylactic acid composition of the present invention is not particularly limited to a specific one as long as the composition having a phase separation structure comprising a phase comprising the polylactic acid-series resin (A) and a phase comprising the acrylic triblock copolymer (B) is obtainable. For example, according to need, the acrylic triblock copolymer (B) may be mixed with the polylactic acid-series resin (A) and the other polymers or additives at the same time, or after mixing the acrylic triblock copolymer (B) with the other polymers or additives, the mixture may be mixed with the polylactic acid-series resin (A). The mixing process may be conducted by using, for example, a conventional mixing or kneading machine (such as a kneader, an extruder, a mixing roll, or a banbury mixer). The temperature at mixing or kneading is preferably adjusted to a suitable one depending on the melting temperatures of the polylactic acid-series resin (A) and the acrylic triblock copolymer (B), and is usually within the range of about 150 to 250° C., preferably about 170 to 240° C., and more preferably about 180 to 230° C. In this manner, the polylactic acid composition of the present invention can be produced in any form of a pellet, a powder, or the like. The polylactic acid composition in the form of a pellet, a powder, or the like, may suitably be used as materials for various molded products (e.g., a molded product having a three-dimensional form, a film, and a fiber).

In the present invention, as described above, the adjustment of the proportion or melt viscosity ratio of the polylactic acid-series resin (A) relative to the acrylic triblock copolymer (B) can govern the morphology of the composition. Furthermore, the adjustment of (P) a parameter represented by the following formula (1) to the range of 0.05 to 10 can govern the morphology of the composition.

$$P = (\eta_A/\eta_B) \times (\phi_B/\phi_A) \tag{1}$$

wherein $\eta_A$ is a melt viscosity (Pa·s) of the polylactic acid-series resin (A) at a temperature of 200° C. and a shear rate of 100 sec$^{-1}$, $\eta_B$ is a melt viscosity (Pa·s) of the acrylic triblock copolymer (B) at a temperature of 200° C. and a shear rate of 100 sec$^{-1}$, $\phi_A$ is a volume fraction (%) (25° C.) of the polylactic acid-series resin (A) relative to the total volume of the polylactic acid-series resin (A) and the acrylic triblock copolymer (B), and $\phi_B$ is a volume fraction (%) (25° C.) of the acrylic triblock copolymer (B) relative to the total volume of the polylactic acid-series resin (A) and the acrylic triblock copolymer (B).

In the above-mentioned formula (1) for calculating the parameter (P) of the polylactic acid composition, the melt viscosity ($\eta_A$) of the polylactic acid-series resin (A) and the melt viscosity ($\eta_B$) of the acrylic triblock copolymer (B) are melt viscosities of each polymers at 200° C. measured by using a capillary rheometer at a shear rate of 100 sec$^{-1}$. The melt viscosities can be measured by the method described in Examples.

In the above-mentioned formula (1) for calculating the parameter (P) of the polylactic acid composition, the ratio ($\phi_B/\phi_A$) (25° C.) of the volume fraction (%) of the acrylic triblock copolymer (B) relative to the volume fraction (%) of the polylactic acid-series resin (A) means a ratio calculated by the following formula (2)

$$\begin{aligned}
\phi_B/\phi_A &= [(W_B/d_B)/(W_A/d_A + W_B/d_B)] \div \\
&\quad [(W_A/d_A)/(W_A/d_A + W_B/d_B)] \\
&= (W_B/d_B) \div (W_A/d_A) \\
&= (W_B/W_A) \times (d_A/d_B)
\end{aligned} \tag{2}$$

wherein $W_A$ is a mass of the polylactic acid-series resin (A) used for the production of the polylactic acid composition, $W_B$ is a mass of the acrylic triblock copolymer (B) used for the production polylactic acid composition, $d_A$ is a specific gravity at 25° C. of the polylactic acid-series resin (A) used for the production of the polylactic acid composition, and $d_B$ is a specific gravity at 25° C. of the acrylic triblock copolymer (B) used for the production of the polylactic acid composition.

In the present invention, the parameter (P) represented by the above-mentioned formula (1) of the polylactic acid composition is adjusted to the predetermined range to form an objective phase separation structure. Furthermore, the adjustment of the proportions of the polylactic acid-series resin (A) relative to the acrylic triblock copolymer (B) to the above-mentioned range can govern the formation of the phase separation structure.

Incidentally, the melt viscosity $\eta_A$ at a temperature of 200° C. and a shear rate of 100 sec$^{-1}$ often depends on the kinds of the polylactic acid-series resins (A) (such as the kinds of commercially available polylactic acids). Furthermore, the melt viscosity $\eta_B$ at a temperature of 200° C. and a shear rate of 100 sec often depends on the kinds of the acrylic triblock copolymers (B) Therefore, even in the same mixing ratio of the polylactic acid-series resin (A) relative to the acrylic triblock copolymer (B), the value of "$\eta_A/\eta_B$" in the above-mentioned formula (1) for calculating parameter (P) varies, thereby varying the value of the parameter (P) as well.

Further, when the acrylic triblock copolymer (B) comprises not less than two kinds of the acrylic triblock copolymers, the parameter (P) may be calculated by using the following $\eta_B$ and $\phi_B$: $\eta_B$ means a melt viscosity (Pa·s) at a temperature of 200° C. and a shear rate of 100 sec$^{-1}$ of the mixture compound obtainable by melt-kneading these acrylic triblock copolymers, and $\phi_B$ means a volume fraction (%) (25° C.) of the mixture compound comprising not less than two kinds of the acrylic triblock copolymers relative to the total volume of the polylactic acid-series resin (A) and the mixture compound comprising not less than two kinds of the acrylic triblock copolymers in the polylactic acid composition.

In specific, the composition having the micro-phase separation structure (I) is preferably produced by the following manner: (i) selecting the kinds of both the polylactic acid-series resin (A) and the acrylic triblock copolymer (B) and changing the mixing ratio thereof to adjust the parameter (P) represented by the formula (1) to the range, for example, about 1.7 to 10, preferably about 1.75 to 8, and more preferably about 1.8 to 7 (particularly about 1.9 to 5); and (ii) melt-kneading the polylactic acid-series resin (A) and the acrylic triblock copolymer (B) thoroughly. An excessively small parameter (P) hinders the formation of the micro-phase separation structure (I). On the other hand, an excessively large parameter (P), in which the melt viscosity ratio becomes excessively large, causes a structure having a bulk dispersed phase comprising the polylactic acid-series resin (A), whereby the properties such as the mechanical properties tend to be deteriorated.

The composition having the co-continuous structure (II) is preferably produced by the following manner: (i) selecting the kinds of both the polylactic acid-series resin (A) and the acrylic triblock copolymer (B) and changing the mixing ratio thereof to adjust the parameter (P) represented by the formula (1) to the range, for example, about 0.05 to 1.7, preferably about 0.1 to 1.5, and more preferably about 0.15 to 1.3 (particularly about 0.2 to 1); and (ii) melt-kneading the polylactic acid-series resin (A) and the acrylic triblock copolymer (B) thoroughly. An excessively small parameter (P), in which the melt viscosity ratio becomes excessively small, tends to deteriorate the dispersibility of the polylactic acid-series resin (A) and the acrylic triblock copolymer (B). On the other hand, an excessively large parameter (P) hinders the formation of the co-continuous structure.

Besides adjusting the parameter (P) to the range, as described above, the acrylic triblock copolymer (B) having the polymer block (B1) in an amount of 25 to 80% by mass (particularly 40 to 60% by mass) is preferably used to stabilize the formation the co-continuous structure (II). The reason for that, the total mass ratio of the polymer blocks (B2a) and (B2b) in the acrylic triblock copolymer affects the morphology of the co-continuous structure due to the good compatibilities with the polylactic acid-series resin of the polymer blocks (B2a) and (B2b). An excessively high total mass of the polymer block (B2a) and the polymer block (B2b) (in other words, an excessively small mass of the polymer block (B1)) forms a structure having the dispersed phase comprising the acrylic triblock copolymer in the matrix comprising the polylactic acid-series resin.

The composition having the micro-phase separation structure (III) is preferably produced by the following manner: (i) selecting the kinds of both the polylactic acid-series resin (A) and the acrylic triblock copolymer (B) and changing the mixing ratio thereof to adjust the parameter (P) represented by the formula (1) to the range, for example, about 0.05 to 1.7, preferably about 0.1 to 1.5, and more preferably about 0.15 to 1.3 (particularly about 0.2 to 1); and (ii) melt-kneading the polylactic acid-series resin (A) and the acrylic triblock copolymer (B) thoroughly. An excessively small parameter (P), in which the melt viscosity ratio becomes excessively small, tends to prevent the acrylic triblock copolymer (B) from dispersing. On the other hand, an excessively large parameter (P) hinders the formation of the micro-phase separation structure having a micro-dispersed phase of the acrylic triblock copolymer (B).

Besides adjusting the parameter (P) to the range, as described above, the acrylic triblock copolymer (B) having the polymer block (B1) in an amount of not less than 40% by mass (particularly, over 65% by mass) is preferably used to stabilize the formation of the micro-phase separation structure (III). An excessively large total mass of the polymer block (B1) and the polymer block (B2b) tends to form a co-continuous structure.

[Molded Product]

Since the polylactic acid composition of the present invention has an excellent melt flowability, the polylactic acid composition can be molded by a molding process or a molding apparatus, which are usually applied to thermoplastic polymers. For example, the composition may be molded by any molding process [e.g., an extrusion molding, an injection molding, a compression molding, a blow molding, a calendar molding, and a vacuum forming (molding)]. The polylactic acid composition can also be subjected to a melt spinning to produce a fiber. Accordingly, various molded products of the polylactic acid composition having any form [for example, a molded product having a three-dimensional form (e.g., a pipe and a mold or a pattern), a sheet, a film, a fiber, and a fiber product] can be produced by using such a conventional molding process.

The molded product of the present invention has excellent transparency, processability, mechanical properties (such as flexibility and impact resistance), a superb weather resistance, a great heat resistance, and an excellent flex resistance. The molded product is also has a high moisture permeability. Further, since the molded product of the present invention mainly comprises the polylactic acid-series resin, which is biodegradable, the spent molded product can be disposed by microbial degradation. Moreover, although the incineration of the spent molded product produces carbon dioxide, the carbon dioxide is consumed at photosynthesis of a plant, which is as a raw material for a polylactic acid-series resin. The increase of carbon dioxide of the global environment is consequently avoided. Accordingly, making the best use of the advantages, the molded product can be used for many applications, for example, an agricultural material, a gardening material, a fishing material, a civil engineering and construction material, apart for automobile, an electric or electronic part, a commodity, a medical material, a writing material, a cloth, a fiber material for advertising such as a bunting (or a drop curtain) or a flag, a general merchandise such as a tent, a bag or a table cloth, a buffer (or a cushioning) material, a heat insulating material, and a protective film, and a substrate film for a adhesive film.

Furthermore, the molded product of the present invention may further comprise a molded product comprising other resins or a layer comprising other components, or the like. The molded product may include, for example, a laminated product containing a layer comprising the polylactic acid composition of the present invention, particularly, an adhesive film, a tarpaulin, and a composite molded product.

The adhesive film of the present invention comprises a substrate film comprising the polylactic acid composition of the present invention and an adhesive layer formed on at least one surface of the substrate film. Since the adhesive film has a high flexibility, the film can be applied to an object, conforming to the shape of the object, no matter how intricate the shape is. In addition, since the adhesive film of the present invention has an excellent transparency, the film attached to (or covering) an object does not change the appearance of the object. Moreover, since the substrate film of the adhesive film of the present invention mainly comprises the polylactic acid-series resin, which is a biomass-based resin, the amount of the carbon dioxide produced by the incineration of the spent adhesive film has little influence on the balance of the carbon dioxide in the air. Making the best use of the advantages, the adhesive film of the present invention may suitably be used as a versatile adhesive tape such as a protective film, an adhesive film for dry cleaning, a medical tape, a tape for food package, a writing material. Especially, the adhesive film of the present invention may preferably be used as a protective film. In specific, the adhesive film may suitably be used as a surface protective film a variety of materials or products (e.g., a metal plate or a metal product such as a stainless-steel plate or an aluminum plate, a synthetic resin plate, a synthetic resin product, a wooden board, and a wood product), a protective film used in processing (such as deep or shallow drawing or cutting), a surface-protective film for an automobile, a protective film for optical member (such as a polarizing plate, a diffusion plate, a retardation plate, a prism-shielding tape, or an optical waveguide), a protective film for wafer processing, a protective film for photo mask, and a masking film for coating with paint.

An adhesive agent constituting the adhesive layer of the adhesive film is not particularly limited to a specific one. A conventionally known adhesive agent such as a natural rubber-series adhesive agent, a synthetic rubber-series adhesive agent, a silicone-series adhesive agent, an acrylic polymer-series adhesive agent, or a polyurethane-series adhesive agent may be used. In particular, since the strong adhesiveness to the substrate film comprising the polylactic acid composition reduces a contamination such as a residual adhesive on an object, an acrylic adhesive agent containing an acrylic polymer, in particular, an acrylic adhesive agent containing an acrylic block copolymer, is preferably used. The block copolymer preferably used as the acrylic block copolymer includes, for example, a block copolymer having a block polymer comprising a unit derived from a methacrylate and/or a polymer block comprising a unit derived from an acrylate. Concrete examples of such a block copolymer includes a diblock copolymer (e.g., a poly(methyl methacrylate)-poly(n-butyl acrylate), a poly(methyl methacrylate)-poly(2-ethylhexyl acrylate), and a poly(methyl methacrylate)-poly(lauryl methacrylate), a triblock copolymer (e.g., a poly(methyl methacrylate)-poly(n-butyl acrylate)-poly(methyl methacrylate), a poly(methyl methacrylate)-poly(2-ethylhexyl acrylate)-poly(methyl methacrylate), and a poly(methyl methacrylate)-poly(lauryl methacrylate)-poly(methyl methacrylate)). These acrylic block copolymers may be used singly or in combination.

Especially, using the same or similar acrylic block copolymer contained in the adhesive agent as or to the acrylic triblock copolymer (B) contained in the polylactic acid composition constituting the substrate film, intensifies the interlayer adhesive strength of the adhesive layer to the substrate film, whereby a high-quality adhesive film is favorably produced.

To reduce the adhesive agent (residual adhesive) on an object after stripping the adhesive film from the object, the proportion of the acrylic block copolymer relative to the total mass of the acrylic adhesive agent is, for example, not less than 20% by mass (for example, about 20 to 100% by mass), preferably not less than 50% by mass (for example, about 50 to 99% by mass), and more preferably not less than 80% by mass (for example, about 80 to 95% by mass).

To adjust adhesiveness or to prevent the film from tucking, the adhesive agent may contain, for example, a tackifier resin, a plasticizer, and other polymers, in addition to the acrylic block copolymer according to need.

The tackifier resin may include, for example, a rosin derivative such as a rosin ester, a gum rosin, a tall oil rosin, a hydrogenated rosin ester, a maleinated rosin, or a disproportionated rosin ester; a terpenephenol resin, a terpen-series resin whose main unit is, e.g., α-pinene, β-pinene, and limonene; a (hydrogenated) petroleum-based resin, a coumarone-indene-series resin, a hydrogenated aromatic copolymer, a styrenic resin, a phenolic resin, and a xylene resin. These tackifier resins may be used singly or in combination.

The plasticizer may include, for example, an ester of a fatty acid such as a phthalate such as dibutylphthalate, di-n-octyl phthalate, bis-2-ethylhexyl phthalate, di-n-decyl phthalate, or diisodecyl phthalate, an adipate such as bis-2-ethylhexyl adipate, or di-n-octyl adipate, a sebacate such as bis-2-ethylhexyl sebacate, di-n-butyl sebacate, or an azelate such as bis-2-ethylhexyl azelate; a paraffin such as a chlorinated paraffin; a glycol such as a polyethylene glycol or a polypropylene glycol; an epoxy-series polymeric plasticizer such as an epoxidized soybean oil or an epoxidized linseed oil; a phosphate such as trioctyl phosphate or triphenyl phosphate; a phosphite such as triphenyl phosphite; an ester oligomer such as an ester of adipic acid and 1,3-butylene glycol; a polybutene; a polyisobutylene; a polyisoprene; a process oil; and a naphthenic oil. These plasticizers may be used singly or in combination.

The other polymers may include, for example, a poly(n-butyl acrylate), EPR, EPDM, an ethylen-acrylate copolymer, an ethylene-vinyl acetate copolymer, and a polyvinyl acetate. These other polymers may be used singly or in combination.

The adhesive agent may include various additives according to need, for example, a stabilizer for enhancing weather resistance, heat resistance, oxidation resistance, or the like (e.g., a antioxidant and an ultraviolet absorber), an inorganic granular filler (e.g., calcium carbonate, titanium oxide, a mica, and a talc), a fibrous filler (e.g., a glass fiber and an organic fiber for reinforcement). These additives may be used singly or in combination.

In the adhesive film of the present invention, the thickness of the substrate film comprising the polylactic acid composition and the thickness of the adhesive layer are not particularly limited to specific ones. To produce and handle the adhesive film easily and to improve the conformability to a surface of an object, the thicknesses of the substrate film and the adhesive layer are usually as follows. For example, the thicknesses of the substrate film is about 5 μm to 1 mm, preferably about 10 to 500 μm, and more preferably about 30 to 300 μm, and the thickness of the adhesive layer is about 1 to 200 μm and particularly about 5 to 100 μm.

The process for producing the adhesive film is not particularly limited to a specific one. The process may include, for example, a process comprising co-extruding a substrate film and an adhesive layer and a process comprising producing a substrate film and then laminating an adhesive layer on the produced substrate film. The former one may include, for example, T-die lamination and inflation molding. The latter one may include, for example, a process comprising producing a substrate film comprising a polylactic acid composition and applying an emulsion type adhesive agent or a solvent type adhesive agent on the film, and a dry lamination. In particular, the process comprising co-melt extrusion molding of a substrate film comprising a polylactic acid composition and an adhesive layer, which ensures the economical and stable production of a high quality adhesive film, is preferably used.

The tarpaulin of the present invention comprises a foundation cloth and a layer comprising the polylactic acid composition of the present invention and formed on at least one side (particularly, the both side) of the foundation cloth. The tarpaulin of the present invention also has a high biomass content and very ecological. A conventional fiber (e.g., a polyamide-series fiber, a polyester-series fiber, a polyvinyl alcohol-series fiber, and a cellulose-series fiber) may be used as the fiber constituting the foundation cloth. The preferred one includes a polylactic acid-series fiber since using the polylactic acid-series fiber favorably increases the biomass content. Moreover using the polylactic acid-series fiber increases the adhesive strength of the layer (film) comprising the polylactic acid composition to the foundation cloth, whereby a highly durable tarpaulin is produced.

In the tarpaulin of the present invention, the thicknesses of the layer comprising and the foundation cloth comprising the polylactic acid composition are not particularly limited to specific ones. To produce and handle the tarpaulin easily and to impart excellent mechanical properties to the tapeline, the thicknesses of the layer and the foundation cloth are usually as follows; the thickness of the layer is, for example, about 5 µm to 1 mm, preferably about 10 to 500 µm, and more preferably about 30 to 300 µm; and the thickness of the foundation cloth is, for example, and 0.01 to 3 mm and preferably about 0.1 to 1 mm.

The process for producing the tarpaulin of the present invention may be, for example, a lamination process comprising laminating a film comprising the polylactic acid composition and a foundation cloth by a laminator (or laminating machine), and a process for producing a tarpaulin directly (e.g., a process comprising subjecting a polylactic acid composition and a foundation cloth to calender topping method.

The composite molded product of the present invention is a molded product obtainable by composite molding of the polylactic acid composition of the present invention and other resins. As long as other resins do not hinder the formation of the composite molded product, other resins are not particularly limited to specific ones. Various thermoplastic resins or thermosetting resins may be used as other resins. In the present invention, the following polar resins may preferably be used. For example, a polyamide-series resin (e.g., an aliphatic polyamide such as a polyamide 6 or a polyamide 66), a polyester-series resin (e.g., a polyalkylene arylate-series resin such as a polyethylene terephthalate or a polybutylene terephthalate), a polycarbonate-series resin (e.g., a bisphenol A-based polycarbonate), a styrenic resin (e.g., a rubber-free styrenic resin such as a polystyrene and a rubber-containing styrenic resin such as an impact resistant polystyrene or an ABS resin), an acrylic resin (e.g., a poly(methyl methacrylate)-series resin such as a poly(methyl methacrylate)), and a polylactic acid-series resin (e.g., the polylactic acid-series resin exemplified in the paragraph of the polylactic acid composition). These polar resins may be used singly or in combination. The composite molded product obtainable in the present invention has a high biomass content and very ecological. Among these polar resins, a polylactic acid-series resin or an acrylic resin is preferred due to the strong adhesiveness thereof, and a polylactic acid-series resin is more preferred due to the biodegradability thereof, is more preferred. Especially, using a polylactic acid-series resin as a polar resin for a double molded product further increases the biomass content of the molded product and imparts an interfacial adhesive strength between the polylactic acid composition (soft component) of the present invention and the polylactic acid-series resin (hard component) to the molded product.

Conventional processes may be used as a process for producing the composite molded product. Examples of the processes which may be used include various processes for molding, e.g., T-die lamination, co-extrusion molding, blow molding, insert injection molding, double mold injection molding, core back injection molding, sandwich injection molding, and injection press molding. In the molding processes, insert injection molding, double mold injection molding, or core back injection molding is widely used.

The insert injection molding may be a process comprising, for example, injection molding a polar resin to give a molded product, inserting (placing) the obtained molded product into (in) a mold, and injection molding the polylactic acid composition of the present invention into a cavity left unoccupied in the mold.

The double mold injection molding may be a process comprising, for example, injection molding a plurality of polar resins into a mold by using a plurality of injection molding machines, revolving or moving the mold to change the position of a cavity left unoccupied in the mold, and injection molding the polylactic acid composition of the present invention into the cavity by using an injection molding.

The core back injection molding may be a process comprising, for example, injection molding a polar resin into a mold by using an injection molding machine, expanding a cavity volume of the mold, and injection molding the polylactic acid composition of the present invention into a cavity left unoccupied in the mold by an injection molding machine.

INDUSTRIAL APPLICABILITY

According to the present invention, the polylactic acid composition and the molded product have excellent properties (e.g., flexibility, moldability, impact resistance, flex fatigue resistance, and thermal adhesiveness) and a high moisture permeability with maintaining the inherent transparency and heat resistance of the polylactic acid-series resin. Furthermore, the polylactic acid composition and the molded product have a suppressed bleed out of the component and a biodegradability. The molded product may be used for many applications, for example, an agricultural material, a gardening material, a fishing material, a civil engineering and construction material, a part for automobile, an electric or electronic part, a commodity, a medical material, a writing material, a cloth, a fiber material for advertising such as a bunting (or a drop curtain) or a flag, a general merchandise such as a tent, a bag or a table cloth, a buffer (or a cushioning) material, a heat insulating material, and a protective film.

EXAMPLES

Hereinafter, the following examples and Comparative Examples are intended to describe this invention in further detail and should by no means be interpreted as defining the scope of the invention. Each property and performance of the polylactic acid, the acrylic block copolymer and the polylactic acid composition were determined or evaluated as shown below. Incidentally, all parts and percentages mean by mass and % by mass unless otherwise indicated.

[Block Structure of Acrylic Block Copolymer and Proportions of Each Polymer Block]

The block structure of the acrylic block copolymer and proportions of each polymer block were determined by $^1$H-NMR ($^1$H-nuclear magnetic resonance analysis).

$^1$H-NMR: [Apparatus] nuclear magnetic resonance apparatus "JNM-LA400" manufactured by JEOL Ltd.

[Deuteration Solvent] Deuterated Chloroform

[Molecular weights (weight-average molecular weight and number-average molecular weight) of acrylic block copolymer and each polymer block of acrylic block copolymer]

The molecular weights (the weight-average molecular weight and the number-average molecular weight) of the acrylic block copolymer and each polymer block thereof were determined by GPC using a polystyrene as a standard substance.

GPC: [Apparatus] GPC apparatus "HLC-8020" manufactured by Tosoh Corporation

[Separation columns] "TSKgel GMHXL", "G4000HXL", and "G5000HXL" manufactured by Tosoh Corporation, and connected in series according to the appearance order

[Eluent] Tetrahydrofuran

[Flow rate of eluent] 1 ml/minute

[Column temperature] 40° C.

[Detection method] differential refractive index (RI)

[Glass-Transition Temperatures of Each Polymer Block of Acrylic Block Copolymer]

The temperature dependency of dynamic viscoelasticities of each polymer block of the acrylic block copolymer was measured to determine a temperature at the maximum loss tangent (tan δ)

Determination of Dynamic Viscoelasticity:

[Apparatus]: wide dynamic viscoelasticity measuring device (forced oscillation non-resonant method) "PVE-V4 FT rheospectorer" manufactured by Rheology

[Conditions of measurement] measuring frequency: 11 Hz measuring mode: drawing heating rate: 3° C./minute strain: 0.03%

[Shape of sample] a strip specimen (pressed sheet) having a length of 20 mm, a width of 5 mm, and a thickness of 1 mm

[Melt viscosities of polylactic acid and acrylic block copolymer at a temperature of 200° C. and a shear rate of 100 sec$^{-1}$]

The melt viscosities of the polylactic acid and the acrylic triblock copolymer were measured by using a capillary rheometer ("Capirograph" manufactured by Toyo Seiki Seisaku-Sho Ltd.). The polylactic acid or the acrylic triblock copolymer was put in the crucible of the capillary rheometer and heated. After reaching the temperature of the polymer 200° C., the melted polymer was loaded at a shear rate of 100 sec$^{-1}$ while keeping the temperature, to measure the melt viscosity (Pa·s).

[Specific Gravities of Polylactic Acid and Acrylic Block Copolymer]

In accordance with JIS K 7112, the specific gravities of polylactic acid and acrylic block copolymer were measured by an electronic densimeter ["ED-120T" offered commercially by Mirage Trading Co., Ltd.].

[Morphology of Polylactic Acid Composition]

The polylactic acid compositions obtained in the following examples were independently press-molded by using a heat compression molding machine (manufactured by Shinto metal Industries, Ltd.), under the condition that temperature was 200° C. and the pressure was 10 MPa, to produce a molded product having a length of 40 mm, a width of 50 mm, and a thickness of 1 mm. The molded product was sliced in the middle of the thickness with a microtome to prepare a test piece. The test piece was stained with an aqueous solution containing phosphotungstic acid, and dried. The obtained surface by slicing the molded product was photographed by using an electron microscope (30,000 times). Based on the obtained photograph, the morphology was visually observed. When the composition had a morphology showing the micro-dispersed phases comprising the polylactic acid or the acrylic block copolymer, the mean particle size of the dispersed phase was measured. The morphology was categorized by the following criteria based on the measurement results of the mean particle size.

I: Micro-phase separation structure having a micro-dispersed phase comprising the polylactic acid in the matrix comprising the acrylic block copolymer, in which the mean particle size of the dispersed phase comprising the polylactic acid is not more than 500 nm and the mean distance between the dispersed phases is not more than 100 nm.

II: Co-continuous structure having both of the continuous phase comprising the polylactic acid and the continuous phase comprising the acrylic block copolymer, in which the mean thickness of the continuous phase comprising the acrylic block copolymer is not more than 100 nm with respect to a thickness direction.

III: Micro-phase separation structure having a micro-dispersed phase comprising the acrylic block copolymer in a matrix comprising the polylactic acid, in which the mean particle size of the dispersed phase is not more than 300 nm.

IV: Phase separation structure having a dispersed phase comprising the polylactic acid in a matrix comprising an acrylic block copolymer, in which the mean particle size of the dispersed phase is more than 500 nm.

[Transparency]

The polylactic acids or polylactic acid compositions obtained in the following examples were independently extrusion molded by using a single layer extruder ["GT-40-A" manufactured by Plabor Co., Ltd.] equipped with a T-shaped coat hanger die having a die width of 550 mm, under the condition that the die temperature was 200° C., to produce a film having a width of 300 mm and a thickness of 100 μm. The film was cut to produce a test piece having a length of 100 mm. In accordance with JIS K 7136, the haze value of the obtained test piece was measured, and the transparency was evaluated by the following criteria.

Good: Haze value is not more than 5

Almost good: Haze value is from more than 5 to less than 10

Slightly bad: Haze value is from not less than 10 to less than 15

Bad: Haze value is not less than 15

In addition, in Examples 13 to 19, the polylactic acid compositions obtained in the following examples were independently press molded by using a heat compression molding machine (manufactured by Shinto Metal Industries, Ltd.), under the condition that the temperature was 200° C. and the pressure was 10 MPa, to prepare a press sheet having a length of 200 mm, a width of 200 mm, and a thickness of 1 mm. In accordance with JIS K 7136, the haze value of the obtained press sheet was measured.

[Flexibility]

The polylactic acids or polylactic acid compositions obtained in the following examples were independently extrusion molded by using a single layer extruder ["GT-40-A" manufactured by Plabor Co., Ltd.] equipped with a T-shaped coat hanger die having a die width of 550 mm, under the condition that the die temperature was 200° C., to produce a film having a width of 300 mm and a thickness of 400 μm.

The obtained film was cut to produce a test piece having a shape of JIS third type for JIS K 6251 test. In accordance with JIS K 6251, the yield stress (MPa) of the test piece was measured.

When the yield stress (MPa) of the film (the test piece) was not more than 50 MPa in either an extrusion direction (an MD direction; hereinafter the same) or a width direction (a TD direction; hereinafter the same) of the film, the film was evaluated as "flexible". When the yield stress (MPa) of the film (the test piece) was greater than 50 MPa in either direction mentioned above of the film, the film was evaluated as "inflexible".

[Tensile Properties (Tensile Strength at Break, Elongation at Break, Maximum Tensile Stress, and Elastic Modulus)]

The polylactic acids or the polylactic acid compositions obtained in the following examples were independently extrusion molded by using a single layer extruder ["GT-40-A" manufactured by Plabor Co., Ltd.] equipped with a T-shaped coat hanger die having a die width of 550 mm, under the condition that the die temperature was 200° C., to produce a film having a width of 300 mm and a thickness of 400 μm. The obtained film was cut to produce a test piece having a shape of JIS third type for JIS K 6251 test. In accordance with JIS K 7127, the tensile strength at break (MPa) and elongation at break (%) were measured.

Incidentally, in Examples 20 to 24, a press sheet having a thickness of 500 μm was cut to produce a test piece having a shape of JIS third type for JIS K 6251 test. In accordance with JIS K 7127, except for a tensile speed of 200 mm/minute, the obtained test piece was used to measure the maximum tensile stress (MPa), elongation at break (%), and elastic modulus (MPa). Incidentally, the elastic modulus was defined as Young's modulus (the stress relative to the strain) obtained by calculating an inclination of the straight line connecting the points at the strains of 1% and 3% based on the stress-strain curve obtained by the tensile test.

[Drawing Property]

Based on the results of the elongation at break, when the breaking elongation in the TD direction was not less than 50%, the film was evaluated as having a drawing property, and when the breaking elongation in the TD direction was less than 50%, the film was evaluated as having no drawing property.

[Impact Resistance]

The polylactic acids or the polylactic acid compositions obtained in the following examples were independently extrusion molded by using a single layer extruder ["GT-40-A" manufactured by Plabor Co., Ltd.] equipped with a T-shaped coat hanger die having a die width of 550 mm, under the condition that the die temperature was 200° C., to produce a film having a width of 300 mm and a thickness of 100 μm. The obtained film was cut to produce test pieces having a length of 10 cm×a width of 10 cm. The impact resistance of the film was measured by using "TTS film impact tester" manufactured by Toyo Seiki Seisaku-Sho Ltd.). In specific, the film (test piece) was kept in a horizontal position in the tester, and a pendulum whose top was equipped with a hemisphere having a diameter of 12.7 mm (0.5 inch) was lowered to hit the center of the film, describing an arc with respect to the fulcrum. The shock load when the film (test piece) was broken was read. The measurement was repeated five times, and the average value was calculated therefrom.

[Flex Resistance]

The polylactic acids or the polylactic acid compositions obtained in the following examples were independently extrusion molded by using a single layer extruder ["GT-40-A" manufactured by Plabor Co., Ltd.] equipped with a T-shaped coat hanger die having a die width of 550 mm, under the condition that the die temperature was 200° C., to produce a film having a width of 300 mm and a thickness of 400 μm.

The obtained film was cut to produce a test piece having 305 mm and 203 mm (12 inches and 8 inches). The test piece was left under the atmosphere of 23° C. and 50% RH for one week to keep the moisture of the film constant. Under the same atmosphere, the test piece was formed into a cylinder shape having a diameter of 88.9 mm (3.5 inches), and the both ends of the film having a cylinder-shape were fixed to the supporters in the Gelbo flex tester. In the flexing test, the initial gripping distance of the film was 177.8 mm (7 inches), the initial distance was reduced to 25.4 mm (1 inch) by a maximum flexing motion, and a twisting motion of 440 degrees in a length of 88.9 mm (3.5 inches) of the initial distance followed by a horizontal motion of 63.5 mm (2.5 inches). Incidentally, in a flexing test, the reciprocating motion was repeated 40 times in a minute, and which was defined as one set of the flexing test. The same test piece was repeatedly subjected to the flexing test until the test piece broke. The number of times of the set (or the number of times of conducting the flexing test) was counted until the test piece broke for the first time. When the number of times of the set is less than 10, the test piece was evaluated as not flex resistant (bad), and when the number of times of the set is not less than 10, the test piece was evaluated as flex resistant (good). Incidentally, the flexing test was repeated five times with respect to each film to calculate the number of times of the set, and the resulting average number of the times of the set was rounded to obtain a number of the times of the sets as integral. Moreover, the existence of a hole was inspected by visual observation and air blowing as follows: putting the film subjected to the test on a filter paper; applying an aqueous ink on a region of the film which possibly had a hole; and removing the film from the filter paper to confirm an existence of the stain of the aqueous ink on the filter paper.

[Sticky Texture]

The polylactic acids or the polylactic acid compositions obtained in the following examples were independently as extrusion molded by using a single layer extruder ["GT-40-A" manufactured by Plabor Co., Ltd.] equipped with a T-shaped coat hanger die having a die width of 550 mm, under the condition that the die temperature was 200° C., to produce a film having a width of 300 mm and a thickness of 400 μm. The obtained film was cut to produce a test piece having a length of 100 mm and a width of 100 mm. Five persons independently touched the surfaces of the test pieces to judge the textures of the films. The evaluation of the texture of the film was based on the following the criteria.

Not sticky: Not less than four persons judged that the film had no sticky texture Slightly sticky: Two or three persons judged that the film had no sticky texture Sticky: Not more than one person judged that the film had no sticky texture (Not less than four persons judged that film had sticky texture)

[Resistance to Piercing]

The polylactic acids or the polylactic acid compositions obtained in the following examples was extrusion molded by using a single layer extruder ["GT-40-A" manufactured by Plabor Co., Ltd.] equipped with a T-shaped coat hanger die having a die width of 550 mm, under the condition that the die temperature was 200° C., to produce a film having a width of 300 mm and a thickness of 100 μm. The obtained film was cut to produce a test piece having a length of 147 mm and a width of 147 mm (5 inches and 5 inches). The test piece was fixed on a doughnut-shaped jig having a hole of diameter of 45 mm in the center thereof and set on an autograph ("AGS-H" manufactured by Shimadzu Corporation), keeping the surface of the film (the surface of the test piece) horizontal. Whereas, a needle having a spherical end of the diameter of 1 mm was fixed to a load cell situated in the upper part of the autograph. The needle was lowered at a speed of 50 mm/minute to pierce the test piece. The strength when the needle tore the test piece was measured. The test was repeated five times with respect to each film to calculate the average value.

[Moisture Permeability]

The polylactic acids or the polylactic acid compositions obtained in the following examples were independently extrusion molded by using a single layer extruder ["GT-40-A" manufactured by Plabor Co., Ltd.] equipped with a T-shaped coat hanger die having a die width of 550 mm, under the condition that the die temperature was 200° C., to produce a film having a width of 300 mm and a thickness of 100 μm. The obtained film was cut to produce a test piece having a shape of JIS third type for JIS K 6251 test. In accordance with JIS Z 0208, the moisture permeability (g/m$^2$·day) of the test piece was measured.

[Tear Strength]

The polylactic acid compositions obtained in Examples 13 to 19 were independently press molded by using a heat compression molding machine (manufactured by Shinto Metal Industries, Ltd.), under the condition that the temperature was 200° C. and the pressure was 10 MPa, to produce a press sheet having a length of 200 mm, a width of 200 mm, and a thickness of 1 mm. In the press sheet, the MD direction of the press sheet was defined as a direction from the center to a corner and the TD direction of the press sheet was defined as a direction vertical to the MD direction. The press sheet was stamped out to produce four test pieces, each of which had a length of 100 mm, a width of 100 mm, and a thickness of 1 mm. In accordance with JIS K 7128-3, the tear strength of the test piece was measured.

[Stress Whitening]

The polylactic acid compositions obtained in Examples 13 to 19 were independently press molded by using a heat compression molding machine (manufactured by Shinto Metal Industries, Ltd.), under the condition that the temperature was 200° C. and the pressure was 10 MPa, to produce a press sheet having a length of 200 mm, a width of 200 mm, and a thickness of 1 mm. The obtained press sheet was bent at an angle of 180 degrees and a presence of the stress whitening in the deformed part was visually inspected.

[Hardness (HDD)]

The polylactic acid compositions obtained in the following examples were independently press molded by using a heat compression molding machine (manufactured by Shinto Metal Industries, Ltd.), under the condition that the temperature was 200° C. and the pressure was 10 MPa, to produce a press sheet having a length of 200 mm, a width of 200 mm, and a thickness of 1 mm. The six pieces of the press sheets obtained from the same composition were neatly laid one on the center parts of another to obtain the laminated sheets having a thickness of 6 mm, to measure the hardness of the press sheet in accordance with JIS K 7215.

[MFR (Melt Flow Rate)]

In accordance with JIS K 7210, under the condition that the temperature was 190° C. and the pressure was 2.16 kgf (21.2N) the MFRs of the polylactic acid compositions were measured.

Moreover, the condensation codes and details of the polylactic acids used in the following examples and Comparative Examples are shown in Table 1 mentioned below.

[Table 1]

TABLE 1

| Mark | Brand name | Melt viscosity (Pa·s) | Specific gravity (25° C.) | Melting point (° C.) | Crystallinity |
|---|---|---|---|---|---|
| (A-1) Polylactic acid | "PLA6400D" produced by Natureworks LLC | 1060 | 1.25 | 168 | crystal |
| (A-2) Polylactic acid | "PLA4060D" produced by Natureworks LLC | 940 | 1.25 | — | amorphous |
| (A-3) Polylactic acid | "PLA6251D" produced by Natureworks LLC | 170 | 1.25 | 170 | crystal |
| (A-4) Polylactic acid | "PLA6201D" produced by Natureworks LLC | 220 | 1.25 | 170 | crystal |
| (A-5) Polylactic acid | "PLA4042D" produced by Natureworks LLC | 1090 | 1.25 | 168 | crystal |

Incidentally, in Table 1, the melt viscosity was a melt viscosity at a temperature of 200° C. and a shear rate of 100 sec$^{-1}$. The polylactic acid (A-2) was amorphous and had no melting point.

Reference Example 1

Organoaluminum Compound

Preparation of isobutylbis(2,6-di-t-butyl-4-methylphenoxy)aluminum

The internal atmosphere of a three-neck flask having an internal volume of 1 L was displaced with argon, and the three-neck flask was equipped with a three-way cock. To the flask were added 250 ml of a dried toluene (obtained by drying toluene with sodium and distilling the dried toluene under an argon atmosphere) and 110 g of 2,6-di-t-butyl-4-methylphenol and dissolved by stirring at a room temperature. To the obtained solution was added 68 ml of triisobutylaluminum, and the mixture was stirred at 80° C. for about 18 hours to prepare a toluene solution of an organoaluminum compound having a concentration of 0.6 mol/l of isobutylbis(2,6-di-t-butyl-4-methylphenoxy)aluminum.

Reference Example 2

Production of (B-1) Acrylic Triblock Copolymer (1) A three-neck flask having an internal volume 10 L was equipped with a three-way cock, and the inside of the flask was deaerated and displaced with nitrogen. Under a room temperature, to the flask were added 5080 g of a dried toluene, 508 g of 1,2-dimethoxyethane, and 280 ml of the toluene solution of the isobutylbis(2,6-di-t-butyl-4-methylphenoxy) aluminum (168 mmol of the organoaluminum compound was contained in the solution) obtained in Reference Example 1. Further, 33.7 mmol of s-butyllithium was added to the flask and then 300 g of methyl methacrylate was added thereto. The mixture was polymerized at a room temperature for 1 hour, and 0.1 g of the polymerization (reaction) solution was sampled (aliquot sample 1).

(2) Following the polymerization (1), the internal temperature of the polymerization solution was cooled down to −25° C., and 1900 g of n-butyl acrylate was added dropwise thereto over 2 hours for a polymerization. After the completion of dropping of n-butyl acrylate, 0.1 g of the reaction solution was sampled (aliquot sample 2).

(3) Following the polymerization (2), to the polymerization (reaction) solution obtained in the step (2) 300 g of methyl methacrylate was further added, and the temperature of the reaction solution was allowed to warm to a room temperature and stirred for 8 hours for a polymerization. Then 4 g of methanol was added to the polymerization (reaction) solution to stop the polymerization. The reaction solution after stopping the polymerization was poured into a large amount of methanol to obtain precipitates (aliquot sample 3).

(4) The obtained aliquot samples 1 to 3 were used to determine the molecular weights (the weight-average molecular weight and the number-average molecular weight) of the finally obtained precipitate (aliquot sample 3) and each polymer block and the content of each polymer block by the above-mentioned method. The finally obtained precipitate was an acrylic triblock copolymer [hereinafter referred as "(B-1) an acrylic triblock copolymer"] comprising a poly(methyl methacrylate)(PMMA)-poly(n-butyl acrylate) (PnBA)-poly(methyl methacrylate) (PMMA). Each weight-average molecular weight of these two poly(methyl methacrylate) blocks was 8,900, and each number-average molecular weight thereof was 7,900 [the molecular weight distribution (Mw/Mn) was 1.13]. The weight-average molecular weight of the poly(n-butyl acrylate) block situated in the center of the acrylic triblock copolymer (B-1) was 59,000. The weight-average molecular weight of the acrylic triblock copolymer (B-1) was 76,800, and the number-average molecular weight thereof was 62,000 [the molecular weight distribution (Mw/Mn) was 1.24].

Moreover, the mass ratio of each polymer block relative to the obtained acrylic triblock copolymer (B-1) was PMMA (12% by mass)-PnBA (76% by mass)-PMMA (12% by mass).

(5) Further, the obtained sample 3 was used to measure the glass-transition temperatures of each polymer block of the acrylic triblock copolymer (B-1) by the above-mentioned method. The glass-transition points of both PMMA blocks at the ends of the acrylic triblock copolymer were 140° C., and the glass-transition temperature of the PnBA block in the center of the acrylic triblock copolymer was −22° C.

(6) In addition, the obtained sample 3 was used to measure the melt viscosity ($\eta_B$) of the acrylic triblock copolymer (B-1) at a temperature of 200° C. and a shear rate of 100 sec$^{-1}$ and the specific gravity (25° C.) of the acrylic triblock copolymer (B-1) by the above-mentioned methods. The melt viscosity ($\eta_B$) was 190 Pa·s and the specific gravity (25° C.) was 1.1.

Reference Example 3

Production of (B-2) Acrylic Triblock Copolymer (1) A three-neck flask having an internal volume 10 L was equipped with a three-way cock, and the inside of the flask was deaerated and displaced with nitrogen. Under a room temperature, to the flask were added 5080 g of a dried toluene, 508 g of 1,2-dimethoxyethane, and 347 ml of the toluene solution of the isobutylbis(2,6-di-t-butyl-4-methylphenoxy) aluminum (208 mmol of the organoaluminum compound was contained in the solution) obtained in Reference Example 1. Further, 41.7 mmol of s-butyllithium was added to the flask and then 1000 g of methyl methacrylate was added thereto. The mixture was polymerized at a room temperature for 1 hour, and 0.1 g of the polymerization (reaction) solution was sampled (aliquot sample 1).

(2) Following the polymerization (1), the internal temperature of the polymerization solution was cooled down to −25° C., and 500 g of n-butyl acrylate was added dropwise thereto over 2 hours for a polymerization. After the completion of dropping of n-butyl acrylate, 0.1 g of the reaction solution was sampled (aliquot sample 2).

(3) Following the polymerization (2), to the polymerization (reaction) solution obtained in the step (2) 1000 g of methyl methacrylate was further added, and the temperature of the reaction solution was allowed to warm to a room temperature and stirred for about 8 hours for a polymerization. Then 4 g of methanol was added to the polymerization (reaction) solution to stop the polymerization. The reaction solution after stopping the polymerization was poured into a large amount of methanol to obtain precipitates (aliquot sample 3).

(4) The obtained aliquot samples 1 to 3 were used to determine the molecular weights (the weight-average molecular weight and the number-average molecular weight) of the finally obtained precipitate (aliquot sample 3) and each polymer block and the content of each polymer block by the above-mentioned method. The finally obtained precipitate was an acrylic triblock copolymer [hereinafter referred as "(B-2) an acrylic triblock copolymer"] comprising a poly(methyl methacrylate) (PMMA)-poly(n-butyl acrylate) (PnBA)-poly(methyl methacrylate) (PMMA). Each weight-average molecular weight of these two poly(methyl methacrylate) blocks was 24,000, and each number-average molecular weight thereof was 22,900 [the molecular weight distribution (Mw/Mn) was 1.05]. The weight-average molecular weight of the poly(n-butyl acrylate) block situated in the center of the acrylic triblock copolymer (B-2) was 13,000. The weight-average molecular weight of the acrylic triblock copolymer (B-2) was 61,000, and the number-average molecular weight thereof was 58,000 [the molecular weight distribution (Mw/Mn) was 1.05].

Moreover, the mass ratio of each polymer block relative to the obtained acrylic triblock copolymer (B-2) was PMMA (40% by mass)-PnBA (20% by mass)-PMMA (40% by mass).

(5) Further, the obtained samples 1 to 3 was used to measure the glass-transition temperatures of each polymer block of the acrylic triblock copolymer (B-2) by the above-mentioned method. The glass-transition points of both PMMA blocks at the ends of the acrylic triblock copolymer were 142° C., and the glass-transition temperature of the PnBA block in the center of the acrylic triblock copolymer was −22° C.

(6) In addition, the obtained sample 3 was used to measure the melt viscosity (SB) of the acrylic triblock copolymer (B-2) at a temperature of 200° C. and a shear rate of 100 sec$^{-1}$ and the specific gravity (25° C.) of the acrylic triblock copolymer (B-2) by the above-mentioned methods. The melt viscosity ($\eta_B$) was 980 Pa·s and the specific gravity (25° C.) was 1.2.

Reference Example 4

Production of (C) Acrylic Diblock Copolymer (1) A three-neck flask having an internal volume 2 L was equipped with a three-way cock, and the inside of the flask was deaerated and displaced with nitrogen. Under a room temperature, to the flask were added 1040 g of a dried toluene, 100 g of 1,2-dimethoxyethane, and 35 ml of the toluene solution of the isobutylbis(2,6-di-t-butyl-4-methylphenoxy)

aluminum (21 mmol of the organoaluminum compound was contained in the solution) obtained in Reference Example 1. Further, 8 mmol of s-butyllithium was added to the flask and then 52 g of methyl methacrylate was added thereto. The mixture was polymerized at a room temperature for 1 hour, and 0.1 g of the polymerization (reaction) solution was sampled (aliquot sample 1).

(2) Following the polymerization (1), the internal temperature of the polymerization solution was cooled down to −25° C., and 347 g of n-butyl acrylate was added dropwise thereto over 2 hours for a polymerization. Then 4 g of methanol was added to the polymerization (reaction) solution to stop the polymerization. The reaction solution after stopping the polymerization was poured into a large amount of methanol to obtain precipitates (aliquot sample 2).

(3) The obtained aliquot samples 1 and 2 were used to determine the molecular weights (the weight-average molecular weight and the number-average molecular weight) of the finally obtained precipitate (aliquot sample 2) and each polymer block and the content of each polymer block by the above-mentioned method. The finally obtained precipitate was an acrylic diblock copolymer [hereinafter referred as "(C) an acrylic diblock copolymer"] comprising a poly(methyl methacrylate)(PMMA)-poly(n-butyl acrylate)(PnBA). The weight-average molecular weight of the poly(methyl methacrylate) was 8,900, and the number-average molecular weight of the poly(methyl methacrylate) was 7,900 [the molecular weight distribution (Mw/Mn) was 1.13]. The weight-average molecular weight of the poly(n-butyl acrylate) block was 59,100. The weight-average molecular weight of the acrylic diblock copolymer (C) was 68,000, and the number-average molecular weight thereof was 56,200 [the molecular weight distribution (Mw/Mn) was 1.21]. Moreover, the mass ratio of each polymer block relative to the obtained acrylic diblock copolymer (C) was PMMA (14% by mass)-PnBA (86% by mass).

(4) Further, the obtained samples 1 and 2 was used to measure the glass-transition temperatures of each polymer block of the acrylic diblock copolymer (C) by the above-mentioned method. The glass-transition point of the PMMA block was 140° C., and the glass-transition temperature of the PnBA block was −22° C.

(5) In addition, the obtained sample 2 was used to measure the melt viscosity ($\eta_B$) of the acrylic diblock copolymer (C) at a temperature of 200° C. and a shear rate of 100 sec$^{-1}$ and the specific gravity (25° C.) of the acrylic diblock copolymer (C) by the above-mentioned methods. The melt viscosity ($\eta_B$) was 120 Pa·s and the specific gravity (25° C.) was 1.1.

Examples 1 to 7 and Comparative Examples 1 to 4

(1) As shown in Table 2, one kind of the polylactic acids (pellet) shown in Table 1 and the acrylic triblock copolymer (B-1) (pellet) produced in Reference Example 2 were mixed with each other in the proportion shown in Table 2. The mixture was fed into a twin screw extruder ("ZSK-25" manufactured by Werner & Pfleiderer GmbH) and melt-kneaded at 200° C. and cut to produce a pellet polylactic acid composition (Examples 1 to 7 and Comparative Examples 2 and 4).

(2) The parameters (P) of the polylactic acid compositions obtained in the step (1) were independently calculated by the above-mentioned formula (1). The results are shown in Table 2.

(3) The polylactic acid compositions obtained in the step (1) were independently molded by the above-mentioned process to produce the test pieces for each test. The properties of the compositions were measured or evaluated by the above-mentioned methods. The results are as shown in following Table 2.

(4) The polylactic acid (A-1) or the polylactic acid (A-2) was singly used to produce the test pieces for each test by the above-mentioned molding process. The properties of the compositions were measured or evaluated. The results are as shown in Table 2 (Comparative Examples 1 and 3).

Figure 2:
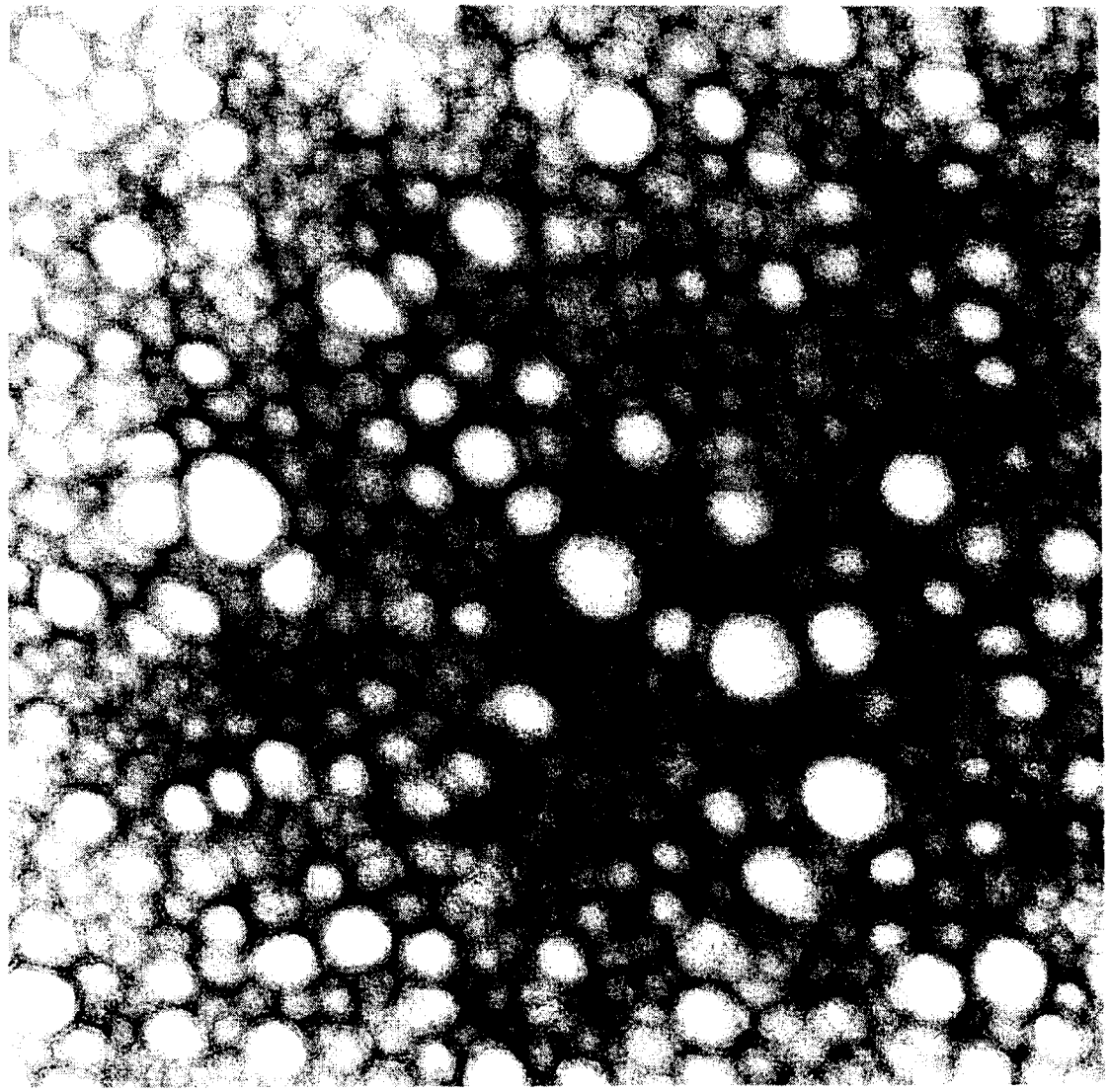
FIG. 2 is an electron micrograph showing a morphology of the polylactic acid composition obtained in Example 2.

(5) Further, the electron micrograph (morphology) of the polylactic acid composition of Example 1 is shown in FIG. 1, and the electron micrograph (morphology) of the polylactic acid composition of Example 2 is shown in FIG. 2.

[Table 2]

TABLE 2

|  | Com. Ex. 1 | Ex. 1 | Ex. 2 | Ex. 3 | Com. Ex. 2 | Com. Ex. 3 |
|---|---|---|---|---|---|---|
| (A-1) Polylactic acid (parts) | 100 | 90 | 70 | 50 | 30 | — |
| (A-2) Polylactic acid (parts) | — | — | — | — | — | 100 |
| (A-3) Polylactic acid (parts) | — | — | — | — | — | — |
| (B-1) Copolymer (parts) | — | 10 | 30 | 50 | 70 | — |
| Morphology | — | III | I | I | IV | — |
| (P) Parameter | — | 0.68 | 2.61 | 6.08 | 14.19 | — |
| Transparency | good | good | good | good | bad | good |
| Haze value | 1 | 3 | 3 | 2 | 18 | 1 |
| Flexibility | inflexible | flexible | flexible | flexible | flexible | inflexible |
| Yield stress in MD (MPa) | 58 | 48 | 9 | — | — | 48 |
| Yield stress in TD (MPa) | 65 | 46 | 8 | — | — | 55 |
| Tensile strength in MD (MPa) | 51 | 30 | 9 | 11 | 8 | 44 |
| Tensile strength in TD (MPa) | 53 | 32 | 7 | 11 | 7 | 47 |
| Elongation at break in MD (%) | 19 | 76 | 64 | 141 | 250 | 16 |
| Elongation at break in TD (%) | 14 | 43 | 54 | 145 | 300 | 15 |
| Stretching property | Not stretchy | stretchy | stretchy | stretchy | not stretchy | not stretchy |
| Impact resistance (J) | 0.07 | 0.32 | 1.19 | 1.59 | — | 0.07 |
| Flex resistance | bad | good | good | good | good | bad |
| Number of times of set | 1 | 15 | 30 | not less than 200 | not less than 200 | 1 |
| Sticky texture | not sticky | Not sticky | sticky | sticky | Sticky | not sticky |
| Resistance to piercing (N) | 12.7 | 11.6 | 2.6 | — | — | 12.3 |
| Moisture permeability (g/cm$^2$ · day) | 84 | 100 | 178 | 338 | 520 | 79 |

TABLE 2-continued

|  | Ex. 4 | Ex. 5 | Ex. 6 | Com. Ex. 4 | Ex. 7 |
|---|---|---|---|---|---|
| (A-1) Polylactic acid (parts) | — | — | — | — | — |
| (A-2) Polylactic acid (parts) | 90 | 70 | 50 | 30 | — |
| (A-3) Polylactic acid (parts) | — | — | — | — | 80 |
| (B-1) Copolymer (parts) | 10 | 30 | 50 | 70 | 20 |
| Morphology | III | I | I | IV | III |
| (P) Parameter | 0.6 | 2.31 | 5.4 | 12.6 | 0.24 |
| Transparency | good | good | good | bad | good |
| Haze value | 4 | 3 | 3 | 19 | 3 |
| Flexibility | flexible | flexible | flexible | flexible | flexible |
| Yield stress in MD (MPa) | 46 | 10 | — | — | 42 |
| Yield stress in TD (MPa) | 30 | 8 | — | — | 27 |
| Tensile strength in MD (MPa) | 28 | 11 | 11 | 8 | 25 |
| Tensile strength in TD (MPa) | 21 | 7 | 10 | 7 | 20 |
| Elongation at break in MD (%) | 114 | 61 | 135 | 250 | 80 |
| Elongation at break in TD (%) | 18 | 59 | 140 | 300 | 50 |
| Stretching property | stretchy | stretchy | stretchy | not stretchy | stretchy |
| Impact resistance (J) | 0.37 | 1.49 | 1.57 | — | 0.61 |
| Flex resistance | good | good | good | good | good |
| Number of times of set | 50 | 82 | not less than 200 | not less than 200 | 40 |
| Sticky texture | not sticky | sticky | sticky | sticky | not sticky |
| Resistance to piercing (N) | 11.1 | 2.9 | — | — | 10.1 |
| Moisture permeability (g/cm$^2$ · day) | 113 | 199 | 365 | 550 | 365 |

In Table 2, the S-S curves of Examples 3 and 6 and Comparative Examples 2 and 4 showed elastomeric (or elastic) behaviors and no yield points. In addition, since the films in Comparative Examples 2 and 4 were flexible, the films were only deformed but never broke, so that the impact resistances were not able to be measured. Moreover, in the test for resistance to piercing with respect to the films in Examples 3 and 6 and Comparative Examples 2 and 4, the film was only stretched to the stretching limits by needles. The needle never tore the film.

Comparative Example 5

(1) Fifty parts by mass of the polylactic acid (A-4) was mixed with 50 parts by mass of an acrylic structure particle ["Parapet SA" manufactured by Kuraray Co., Ltd. (a multilayer particle comprising a layer comprising a poly(n-butyl acrylate) as a main component and a outer layer comprising a poly(methyl methacrylate) as a main component)] instead of the acrylic triblock copolymer (B-1) produced in Reference Example 2. The mixture was fed into the twin screw extruder used in Example 1, melt-kneaded at 200° C., extruded, and cut to produce the pellets of a polylactic acid composition.

Figure 3:
FIG. 3 is an electron micrograph showing a morphology of the polylactic acid composition obtained in Comparative Example 5.
Figure 4:
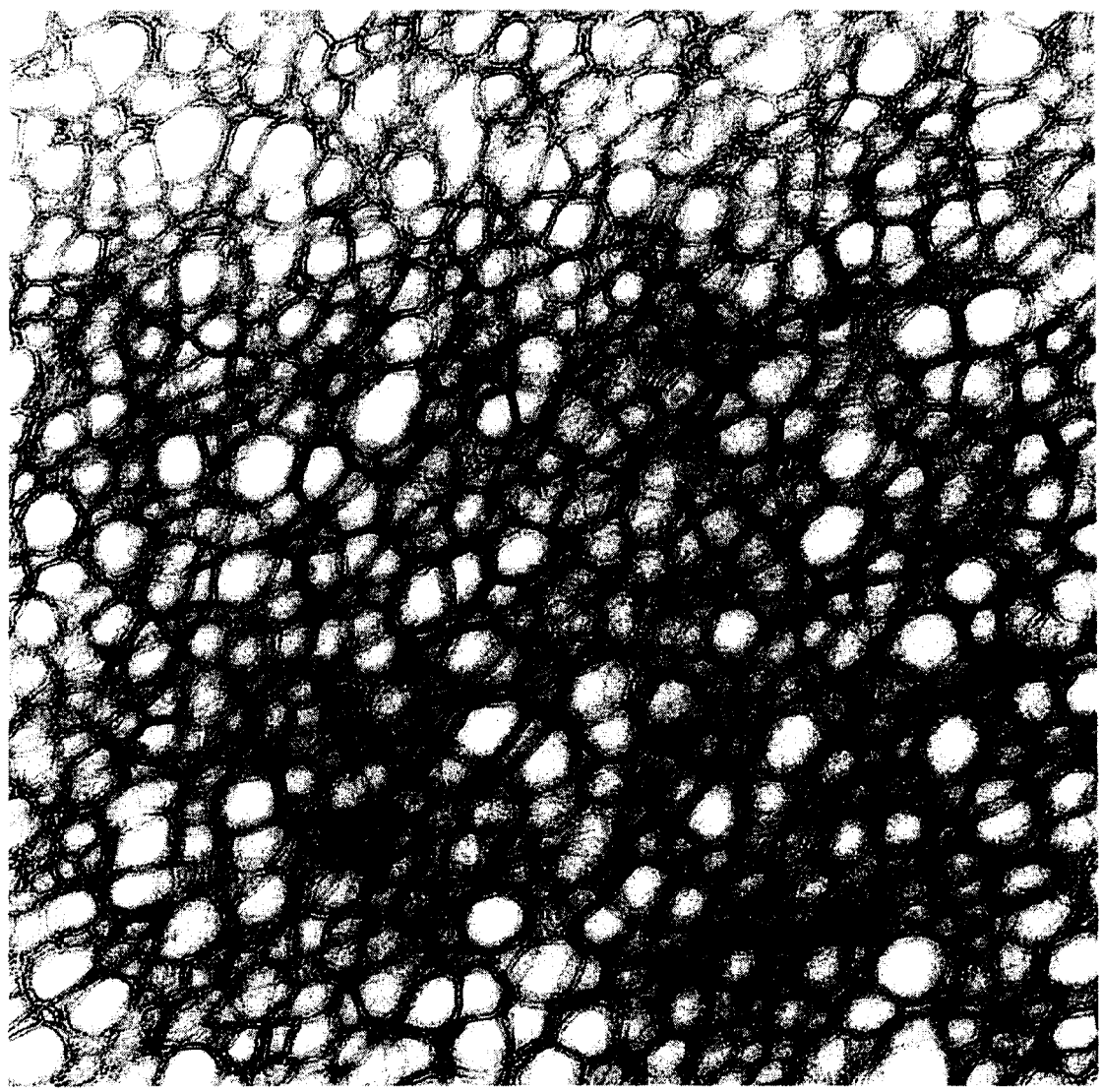
FIG. 4 is an electron micrograph showing a morphology of the polylactic acid composition obtained in Example 14.
Figure 5:
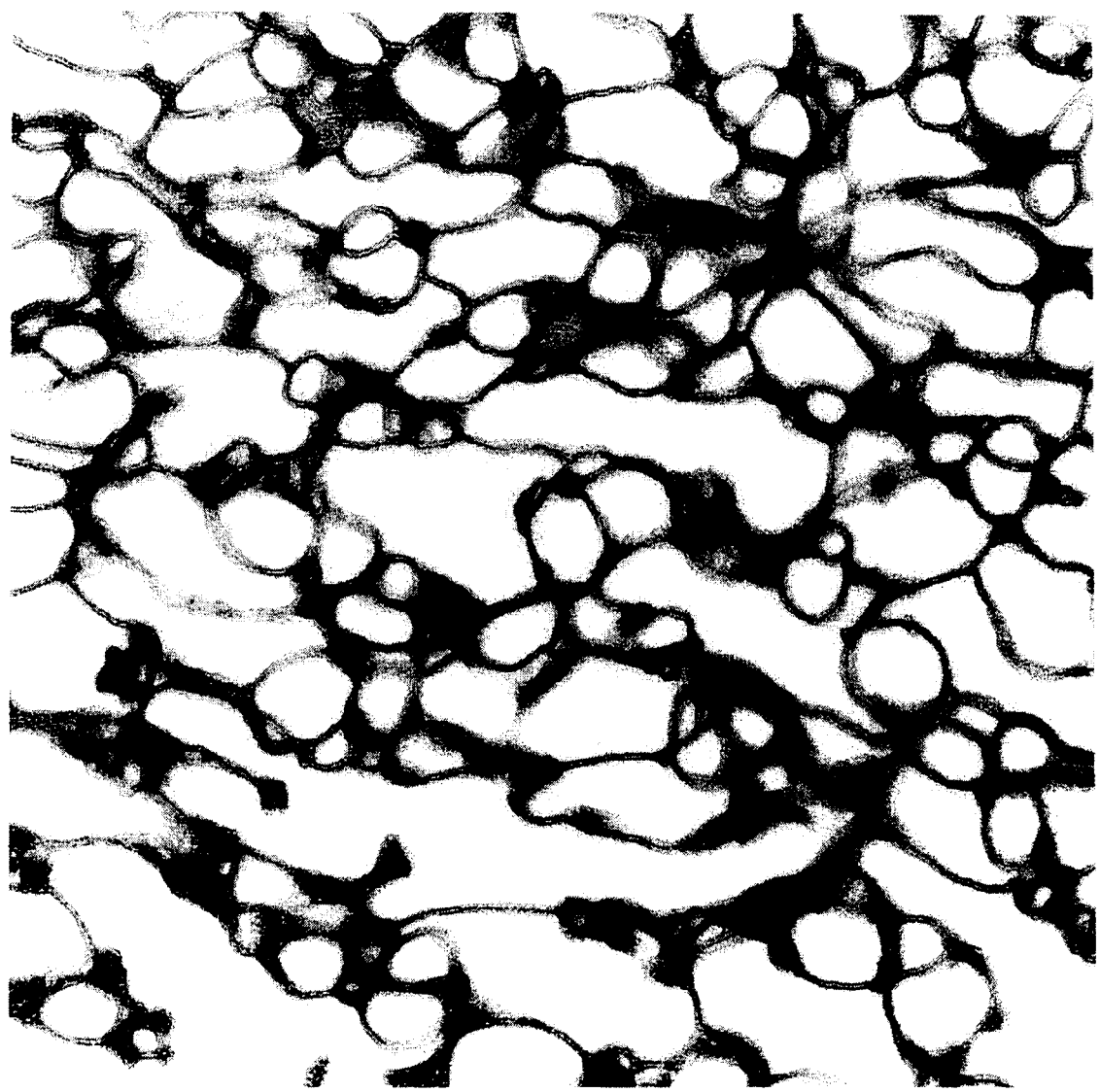
FIG. 5 is an electron micrograph showing a morphology of the polylactic acid composition obtained in Example 16.
Figure 6:
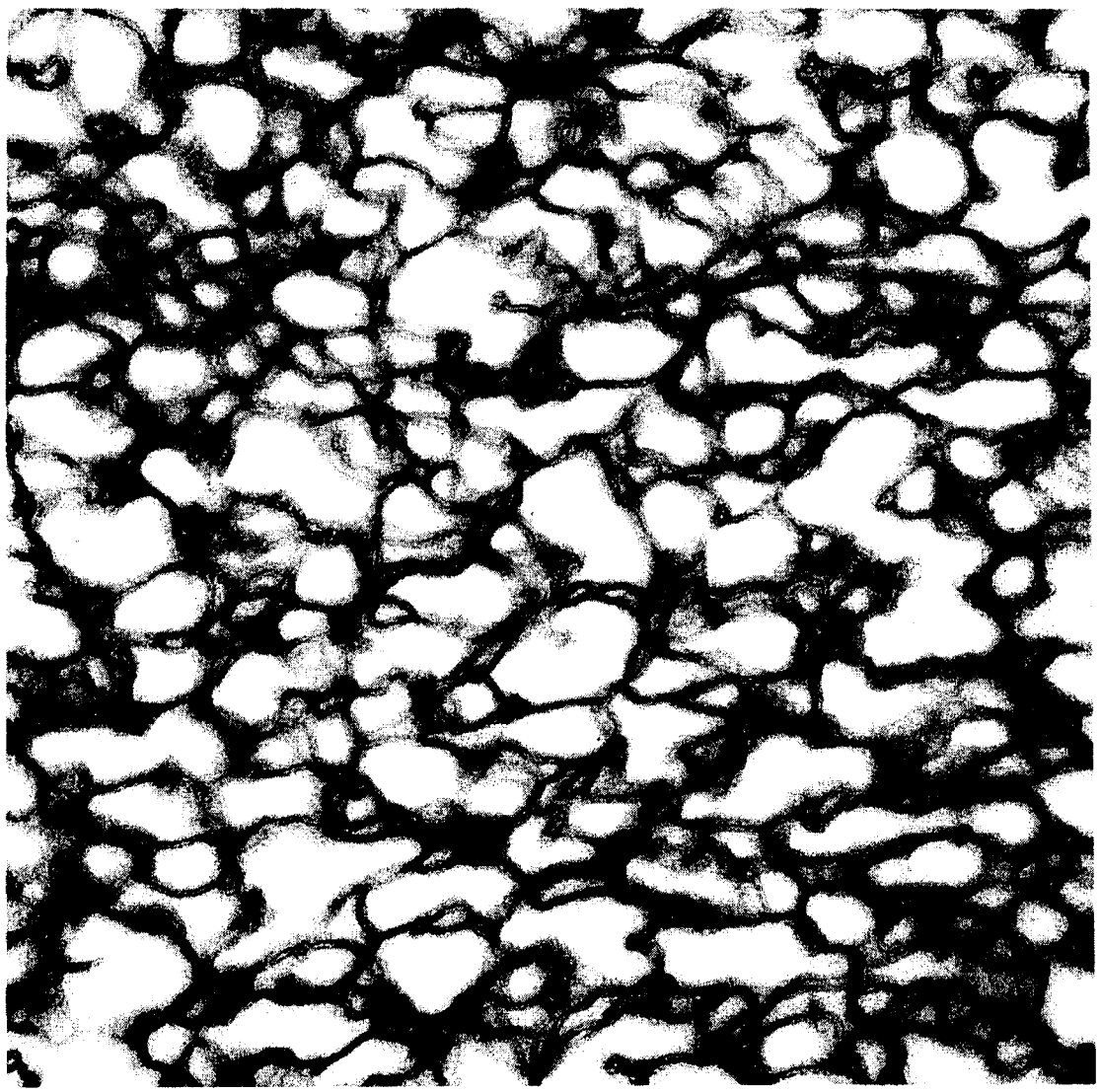
FIG. 6 is an electron micrograph showing a morphology of the polylactic acid composition obtained in Example 17.
Figure 7:
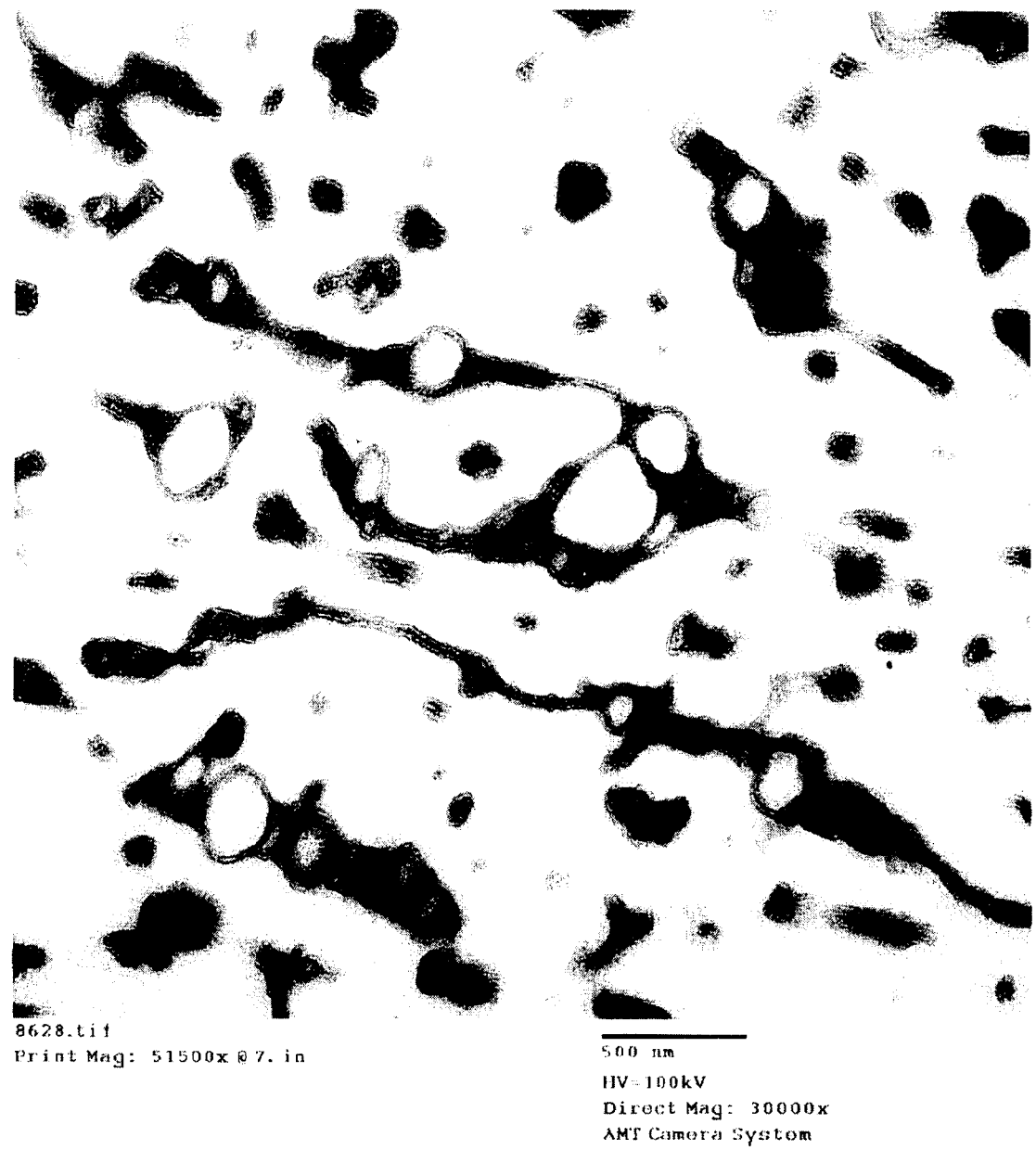
FIG. 7 is an electron micrograph showing a morphology of the polylactic acid composition obtained in Example 19.

(2) The polylactic acid composition obtained in the step (1) was used to prepare test pieces for the morphology observation and the evaluations of transparency and flexibility by the above-mentioned methods. The properties of the composition were measured or evaluated by the above-mentioned methods. As shown in FIG. 3 (the electron micrograph), the composition had the morphology in which the particles having the acrylic multilayer structure were not finely dispersed, but aggregated in the polylactic acid (A-4) Moreover, the test piece (thickness was 100 μm) obtained from the polylactic acid composition in Comparative Example 5 had a high haze value, which was 17, and a poor transparency. Further, the test piece had high yield strengths in the MD direction and in the TD direction, respectively 48 MPa and 51 MPa, and a poor flexibility.

Comparative Example 6

(1) Seventy parts by mass of the polylactic acid (A-1) was mixed with 30 parts by mass of a poly(methylmethacrylate) ("Parapet" manufactured by Kuraray Co., Ltd.) instead of the acrylic triblock copolymer (B-1) produced in Reference Example 2. The mixture was fed into the twin screw extruder used in Example 1, melt-kneaded at 200° C., extruded, and cut to produce the pellets of a polylactic acid composition.

(2) The polylactic acid composition obtained in the step (1) was used to produce test pieces for evaluations of transparency, flexibility and flex resistance by the above-mentioned process. The properties of the composition were measured or evaluated by the above-mentioned methods. The composition had an excellent transparency. However, the composition had high yield strengths in MD direction and in TD direction, respectively 58 MPa and 60 MPa, and a poor flexibility. Further, in the test of flex resistance, the test piece was broken in the first set of the flexing test, and the number of times of the set was nine. The film had a poor flex resistance.

Comparative Example 7

(1) Ninety parts by mass of the polylactic acid (A-1), 3 parts by mass of a poly(methyl methacrylate) ("Parapet" manufactured by Kuraray Co., Ltd.), and 7 parts by mass of a poly(n-butyl acrylate) were mixed with each other. The mixture was fed into the twin screw extruder used in Example 1, melt-kneaded at 200° C., extruded, and cut to produce the pellets of a polylactic acid composition.

(2) The polylactic acid composition obtained in the step (1) was used to produce test pieces for evaluation of transparency by the above-mentioned process. Each of the polymer components was not finely dispersed, forming bulky phases. The composition had a very poor transparency. Further, the composition had a sticky texture due to the significant bleed out of the polymer components.

Comparative Example 8

(1) Ninety parts by mass of the polylactic acid (A-1) was mixed with 10 parts by mass of the acrylic triblock copolymer (B-2) produced in Reference Example 3. The mixture was fed into the twin screw extruder used in Example 1, melt-kneaded at 200° C., extruded, and cut to produce the pellets of a polylactic acid composition.

(2) The polylactic acid composition obtained in the step (1) was used to produce test pieces for evaluation of transparency, flexibility and flex resistance by the above-mentioned process. However, the composition had a phase structure in which the acrylic triblock copolymer (B-2) and the polylactic acid (A-1) blended in each other. Since the acrylic triblock copolymer (B-2) did not finely disperse, a micro particles comprising the acrylic triblock copolymer (B-2) were not formed in a matrix comprising the polylactic acid (A-1). The composition was transparent, however, the composition had high yield strengths in MD direction and in TD direction, respectively 55 MPa and 60 MPa, and a poor flexibility. In addition, in the test of flex resistance, the test piece was broken in the first set of the flexing test, and the composition had a poor flex resistance.

Comparative Example 9

(1) Ninety parts by mass of the polylactic acid (A-1) was mixed with 10 parts by mass of the acrylic diblock copolymer (C) produced in Reference Example 4. The mixture was fed into the twin screw extruder used in Example 1, melt-kneaded at 200° C., extruded, and cut to produce the pellets of a polylactic acid composition.

(2) The polylactic acid composition obtained in the step (1) was used to produce test pieces for evaluation of transparency by the above-mentioned process. Each of the polymer components was not finely dispersed, forming bulky phases. The composition had a very poor transparency. Further, the composition had a sticky texture due to the significant bleed out of the polymer components.

Comparative Example 10

(1) Eighty-five parts by mass of the polylactic acid (A-1) was mixed with 15 parts by mass of a plasticizer [a polyethylene glycol dibenzoate ("LA-100" manufactured by New Japan Chemical Co., Ltd.). The mixture was fed into the twin screw extruder used in Example 1, melt-kneaded at 200° C., extruded, and cut to produce the pellets of a polylactic acid composition.

(2) The polylactic acid composition obtained in the step (1) was used to produce test pieces for evaluation of transparency, flexibility and flex resistance by the above-mentioned process. The composition was transparent and flexible. However, the plasticizer greatly bled out, and the heat resistance of the composition was low.

Example 8

(1) The components same as the Example 1, that is, 90 parts by mass of the polylactic acid (A-1) and 10 parts by mass of the acrylic triblock copolymer (B-1) produced in Reference Example 2 were used, however the both polymers were not mixed each other before feeding. The acrylic triblock copolymer (B-1) was directly fed into a feed part located near a die of the extruder and extruded to produce pellets of a polylactic acid composition. Consequently, the melt-mixing of the polylactic acid (A-1) and the acrylic triblock copolymer (B-1) was not enough, and the obtained morphology did not show that the acrylic triblock copolymer (B-1) finely dispersed, forming micro particles in a matrix comprising the polylactic acid (A-1). For that reason, the molded products (test pieces) obtained from the polylactic acid composition in Example 8 had poor performances in all of the properties (e.g., transparency, flexibility, and flex resistance).

Example 9

Production of Adhesive Film by Lamination (1) Thirty six parts by mass of the acrylic triblock copolymer (B-1) produced in Reference Example 2 and 4 parts by mass of a tackifier resin ("Superester A100" manufactured by Arakawa Chemical Industries Ltd.) were dissolved in 60 parts by mass of toluene to prepare a solution containing an adhesive agent. The solution containing the adhesive agent was applied on a releasable polyethylene terephthalate film ("E7002" manufactured by Toyobo Co., Ltd.) by using a coater to give a dry thickness of the adhesive layer of 25 μm. The polyethylene terephthalate film (releasable film) was dried at 150° C. for 30 minutes to form an adhesive coating thereon.

(2) The pellets of the polylactic acid composition obtained in the step (1) in Example 1 was extruded by using a single layer extruder ["GT-40-A" manufactured by Plabor Co., Ltd.] equipped with a T-shaped coat hanger die having a die width of 550 mm, under the condition that the die temperature was 200° C., to produce a film composition having a width of 300 mm and a thickness of 100 μm.

(3) The surface of the acrylic triblock copolymer (B-1) layer (film of adhesive agent) formed on the polyethylene terephthalate film (releasable film) obtained in the step (1) and the surface of the film produced in the step (2) from the polylactic acid composition were in contact with each other to laminate by a laminator, and an adhesive film which comprises a substrate comprising the film produced from the polylactic acid composition and the adhesive layer [the acrylic triblock copolymer (B-1) layer] on the substrate was produced (the polyethylene terephthalate film acted as the releasable film).

(4) The polyethyleneterephthalate film (releasable film) was removed from the adhesive film obtained in the step (3) and the adhesive film was attached to a stainless-steel plate by attaching the exposed adhesive layer thereto. The plate with the film was left under a room temperature for one month, and the appearance and removability of the adhesive film were evaluated. In the observation, the adhesive film firmly attached to the whole area of the surface of the stainless-steel plate without lifting or peeling. Then the film was peeled from the stainless-steel plate by a hand. The adhesive film was completely removed from the stainless-steel plate without any adhesive agent remaining (residual adhesive agent) thereon. As a result, the adhesive film was effectively able to be used as a protective film.

Example 10

Except for using the pellets of the polylactic acid composition obtained in the (1) in Example 2 instead of the pellets of the polylactic acid composition obtained in the (1) in Example 1, an adhesive film was produced by using the same manner and evaluated by the same procedure as in Example 9. The results were similar to that of Example 9.

Example 11

Production of Adhesive Film by Co-Melt Extrusion Molding (1) The pellets of the polylactic acid composition obtained in the step (1) in Example 1 was melt-extruded from a single screw extruder (a main-extruder having a barrel diameter of 22 mm) at a rate of 3 kg/hour, and simultaneously, the acrylic triblock copolymer (B-1) produced in Reference Example 2 was melt-extruded from another single screw extruder (a sub-extruder having a barrel diameter of 22 mm) at a rate of 1 kg/hour. Then the both melt-extruded compositions were introduced into a feed block, respectively from the above barrel and the below barrel, to extrude an integrally laminated film from a die for producing a film, having a width of 200 mm and a lip distance of 0.1 mm. The obtained laminated film comprised a film comprising the polylactic acid composition and the acrylic triblock copolymer (B-1) layer (adhesive layer) laminated thereon. Then a releasable polyethylene terephthalate was put on the surface of the obtained laminated film, and the film was passed through a polishing roll to produce an adhesive film with the releasable film. The thicknesses of the substrate layer and the sticky layer of the adhesive film obtained by the process were 75 μm and 25 μm, respectively.

(2) The polyethyleneterephthalate film (releasable film) was removed from the adhesive film obtained in the step (1) and the adhesive film was attached to an acrylic resin plate by attaching the exposed adhesive layer thereto. The plate with the film was left under a room temperature for one month, and the appearance and removability of the adhesive film were evaluated. In the observation, the adhesive film firmly attached to the whole area of the surface of the acrylic resin plate without lifting or peeling. Then the film was peeled from the acrylic resin plate by a hand. The adhesive film was completely removed from the stainless-steel plate without any adhesive agent remaining (residual adhesive) thereon. As a result, the adhesive film was effectively able to be used as a protective film.

Example 12

Except for using the pellets of the polylactic acid composition obtained in the step (1) in Example 2 instead of the pellets of the polylactic acid composition obtained in the step (1) in Example 1, an adhesive film was produced by using the same manner and evaluated by the same procedure as in Example 11. The results were similar to those of Example 11.

Reference Example 5

Production of (B-3) Acrylic Triblock Copolymer (1) A three-neck flask having an internal volume 10 L was equipped with a three-way cock, and the inside of the flask was deaerated and displaced with nitrogen. Under a room temperature, to the flask were added 5080 g of a dried toluene, 508 g of 1,2-dimethoxyethane, and 347 ml of the toluene solution of the isobutylbis(2,6-di-t-butyl-4-methylphenoxy)aluminum obtained in Reference Example 1 (208 mmol of the organoaluminum compound was contained in the solution). Further, 46 mmol of s-butyllithium was added to the flask and then 400 g of methyl methacrylate was added thereto. The mixture was polymerized at a room temperature for 1 hour, and 0.1 g of the polymerization (reaction) solution was sampled (aliquot sample 1).

(2) Following the polymerization (1), the internal temperature of the polymerization solution was cooled down to −25° C., and 1700 g of n-butyl acrylate was added dropwise thereto over 2 hours for a polymerization. After the completion of dropping of n-butyl acrylate, 0.1 g of the reaction solution was sampled (aliquot sample 2).

(3) Following the polymerization (2), to the polymerization (reaction) solution obtained in the step (2) was 400 g of methyl methacrylate further added, and the temperature of the reaction solution was allowed to warm to a room temperature and stirred for 8 hours for a polymerization. Then 4 g of methanol was added to the polymerization (reaction) solution to stop the polymerization. The reaction solution after stopping the polymerization was poured into a large amount of methanol to obtain precipitates (aliquot sample 3).

(4) The obtained aliquot samples 1 to 3 were used to determine the molecular weights (the weight-average molecular weight and the number-average molecular weight) of the finally obtained precipitate (aliquot sample 3) and each polymer block and the content of each polymer block by the above-mentioned method. The finally obtained precipitate was an acrylic triblock copolymer [hereinafter referred as "(B-3) an acrylic triblock copolymer"] comprising a poly(methyl methacrylate) (PMMA)-poly(n-butyl acrylate) (PnBA)-poly(methyl methacrylate) (PMMA). Each weight-average molecular weight of these two poly(methyl methacrylate) blocks was 9,800, and each number-average molecular weight thereof was 8,700 [the molecular weight distribution (Mw/Mn) was 1.13]. The weight-average molecular weight of the poly(n-butyl acrylate) block situated in the center of the acrylic triblock copolymer (B-3) was 40,400. The weight-average molecular weight of the acrylic triblock copolymer (B-3) was 60,000, and the number-average molecular weight thereof was 48,400 [the molecular weight distribution (Mw/Mn) was 1.24].

Moreover, the mass ratio of each polymer block relative to the obtained acrylic triblock copolymer (B-3) was PMMA (16% by mass)-PnBA (68% by mass)-PMMA (16% by mass).

(5) Further, the obtained samples 1 to 3 were used to measure the glass-transition temperatures of each polymer block of the acrylic triblock copolymer (B-3) by the above-mentioned method. The glass-transition points of both PMMA blocks at the ends of the acrylic triblock copolymer were 140° C., and the glass-transition temperature of the PnBA block in the center of the acrylic triblock copolymer was −23° C.

(6) In addition, the obtained sample 3 was used to measure the melt viscosity ($\eta_B$) of the acrylic triblock copolymer (B-3) at a temperature of 200° C. and a shear rate of 100 sec$^{-1}$ and the specific gravity (25° C.) of the acrylic triblock copolymer (B-3) by the above-mentioned methods. The melt viscosity ($\eta_B$) was 210 Pa·s and the specific gravity (25° C.) was 1.05.

Reference Example 6

Production of (B-4) Acrylic Triblock Copolymer (1) A three-neck flask having an internal volume 10 L was equipped with a three-way cock, and the inside of the flask was deaerated and displaced with nitrogen. Under a room temperature, to the flask were added 5080 g of a dried toluene, 508 g of 1,2-dimethoxyethane, and 347 ml of the toluene solution of the isobutylbis(2,6-di-t-butyl-4-methylphenoxy)aluminum obtained in Reference Example 1 (208 mmol of the organoaluminum compound was contained in the solution). Further, 46 mmol of s-butyllithium was added to the flask and then 400 g of methyl methacrylate was added thereto. The mixture was polymerized at a room temperature for 1 hour, and 0.1 g of the polymerization (reaction) solution was sampled (aliquot sample 1).

(2) Following the polymerization (1), the internal temperature of the polymerization solution was cooled down to −25° C., and 1250 g of n-butyl acrylate was added dropwise thereto over 2 hours for a polymerization. After the completion of dropping of n-butylacrylate, 0.1 g of the reaction solution was sampled (aliquot sample 2).

(3) Following the polymerization (2), to the polymerization (reaction) solution obtained in the step (2) 850 g of methyl methacrylate was further added, and the temperature of the reaction solution was allowed to warm to a room temperature and stirred for 8 hours for a polymerization. Then 4 g of methanol was added to the polymerization (reaction) solution to stop the polymerization. The reaction solution after stopping the polymerization was poured into a large amount of methanol to obtain precipitates (aliquot sample 3).

(4) The obtained aliquot samples 1 to 3 were used to determine the molecular weights (the weight-average molecular weight and the number-average molecular weight) of the finally obtained precipitate (aliquot sample 3) and each polymer block and the content of each polymer block by the above-mentioned method. The finally obtained precipitate was an acrylic triblock copolymer [hereinafter referred as "(B-4) an acrylic triblock copolymer"] comprising a poly (methyl methacrylate) (PMMA)-poly(n-butyl acrylate) (PnBA)-poly(methyl methacrylate) (PMMA). The weight-average molecular weights of one of the two poly(methyl methacrylate) blocks was 9,800, and the number-average molecular weights thereof was 8,700 [the molecular weight distribution (Mw/Mn) was 1.13]. The weight-average molecular weight of another poly(methyl methacrylate) block was 22,700. The weight-average molecular weight of the poly(n-butyl acrylate) block situated in the center of the acrylic triblock copolymer (B-4) was 32,500. The weight-average molecular weight of the acrylic triblock copolymer (B-4) was 65,000, and the number-average molecular weight thereof was 56,500 [the molecular weight distribution (Mw/Mn) was 1.15].

Moreover, the mass ratio of each polymer block relative to the obtained acrylic triblock copolymer (B-4) was PMMA (16% by mass)-PnBA (50% by mass)-PMMA (34% by mass) (the degree of asymmetricity was 2.13).

(5) Further, the obtained samples 1 to 3 was used to measure the glass-transition temperatures of each polymer block of the acrylic triblock copolymer (B-4) by the above-mentioned method. The glass-transition points of both PMMA blocks at the ends of the acrylic triblock copolymer were 141° C., and the glass-transition temperature of the PnBA block in the center of the acrylic triblock copolymer was −22° C.

(6) In addition, the obtained sample 3 was used to measure the melt viscosity ($\eta_B$) of the acrylic triblock copolymer (B-4) at a temperature of 200° C. and a shear rate of 100 sec$^{-1}$ and the specific gravity (25° C.) of the acrylic triblock copolymer (B-4) by the above-mentioned methods. The melt viscosity ($\eta_B$) was 1100 Pa·s and the specific gravity (25° C.) was 1.07.

Reference Example 7

The acrylic triblock copolymers (B-3) and (B-4) obtained in Reference Example 5 and 6, respectively, were melt-kneaded in a mass ratio of 40:60 with LABO PLASTOMILL (manufactured by Toyo Seiki Seisaku-Sho Ltd.) at a temperature of 200° C. The melt viscosity ($\eta_B$) at a temperature of 200° C. and a shear rate of 100 sec$^{-1}$ and the specific gravity (25° C.) of the obtained mixture were measured by the above-mentioned method. The melt viscosity ($\eta_B$) was 740 Pa·s and the specific gravity (25° C.) was 1.06.

Reference Example 8

The acrylic triblock copolymers (B-3) and (B-4) obtained in Reference Examples 5 and 6, respectively, were melt-kneaded in a mass ratio of 20:30 with LABO PLASTOMILL (manufactured by Toyo Seiki Seisaku-Sho Ltd.) at a temperature of 200° C. The melt viscosity ($\eta_B$) at a temperature of 200° C. and a shear rate of 100 sec$^{-1}$ and the specific gravity (25° C.) of the obtained mixture were measured by the above-mentioned method. The melt viscosity ($\eta_B$) was 740 Pa·s and the specific gravity (25° C.) was 1.06.

Reference Example 9

The acrylic triblock copolymers (B-3) and (B-4) obtained in Reference Examples 5 and 6, respectively, were melt-kneaded in a mass ratio of 10:20 with LABO PLASTOMILL (manufactured by Toyo Seiki Seisaku-Sho Ltd.) at a temperature of 200° C. The melt viscosity ($\eta_B$) at a temperature of 200° C. and a shear rate of 100 sec$^{-1}$ and the specific gravity (25° C.) of the obtained mixture were measured by the above-mentioned method. The melt viscosity ($\eta_B$) was 740 Pa·s and the specific gravity (25° C.) was 1.06.

Reference Example 10

The acrylic triblock copolymers (B-3) and (B-4) obtained in Reference Examples 5 and 6, respectively, were melt-kneaded in a mass ratio of 20:10 with LABO PLASTOMILL (manufactured by Toyo Seiki Seisaku-Sho Ltd.) at a temperature of 200° C. The melt viscosity ($\eta_B$) at a temperature of 200° C. and a shear rate of 100 sec$^{-1}$ and the specific gravity (25° C.) of the obtained mixture were measured by the above-mentioned method. The melt viscosity ($\eta_B$) was 510 Pa·s and the specific gravity (25° C.) was 1.06.

Reference Example 11

The acrylic triblock copolymers (B-3) and (B-4) obtained in Reference Examples 5 and 6, respectively, were melt-kneaded in a mass ratio of 10:10 with LABO PLASTOMILL (manufactured by Toyo Seiki Seisaku-Sho Ltd.) at a temperature of 200° C. The melt viscosity ($\eta_B$) at a temperature of 200° C. and a shear rate of 100 sec$^{-1}$ and the specific gravity (25° C.) of the obtained mixture were measured by the above-mentioned method. The melt viscosity ($\eta_B$) was 650 Pa·s and the specific gravity (25° C.) was 1.06.

Examples 13 to 19

(1) The polylactic acid (A-5), the acrylic triblock copolymer (B-3) and/or (B-4), and a hydrolysis suppressing agent ("Carbodilite LA-1" manufactured by Nisshinbo Industries Inc.) were melt-kneaded in a proportion shown in Table 3 with LABO PLASTOMILL (manufactured by Toyo Seiki Seisaku-Sho Ltd.) at a temperature of 200° C. to produce a polylactic acid composition.

(2) The parameters (P) of the polylactic acid compositions obtained in the step (1) were calculated by the above-mentioned formula (1) and were as shown in Table 3. Incidentally, the parameters (P) of the polylactic acid compositions in Examples 14 to 16 and 19 were independently calculated based on the melt viscosities and specific gravities of the mixtures obtained by melt-kneading the acrylic triblock copolymers (B-3) and (B-4) in predetermined mass ratios.

(3) The polylactic acid compositions obtained in the (1) were independently press molded by using a thermal compression molding machine (manufactured by Shinto metal Industries, Ltd.) under the condition that the temperature was 200° C. and the pressure was 10 MPa to produce a press sheet having a length of 200 mm, a width of 200 mm, and a thickness of 1 mm. The properties of the press sheets were measured or evaluated by the above-mentioned method, and the results were as shown in Table 3.

(4) Moreover, the electron micrographs (morphologies) of the polylactic acid compositions in Examples 14, 16, 17, and 19 are shown in FIGS. 4, 5, 6, and 7, respectively.

[Table 3]

TABLE 3

|  | Ex. 13 | Ex. 14 | Ex. 15 | Ex. 16 | Ex. 17 | Ex. 18 | Ex. 19 |
| --- | --- | --- | --- | --- | --- | --- | --- |
| (A-5) Polylactic acid (parts) | 70 | 50 | 70 | 70 | 70 | 80 | 80 |
| (B-3) Copolymer (parts) | 30 | 20 | 20 | 10 | — | 20 | 10 |
| (B-4) Copolymer (parts) | — | 30 | 10 | 20 | 30 | — | 10 |
| Hydrolysis suppressing agent (parts) | 0.7 | 0.5 | 0.7 | 0.7 | 0.7 | 0.8 | 0.8 |
| Morphology | I | I | I | II | II | III | III |
| (P) Parameter | 2.65 | 1.74 | 1.08 | 0.69 | 0.5 | 1.54 | 0.49 |
| Haze value (press sheet having a thickness of 1 mm) | 78 | 56 | 72 | 55 | 56 | 90 | 78 |
| Tear strength in MD (MPa) | 4.4 | 2.7 | 10 | 82 | 140 | 190 | 170 |
| Tear strength in TD (MPa) | 5.6 | 9.5 | 19 | 180 | 280 | 180 | 180 |
| Stress whitening | white | not white | white | not white | not white | white | not white |
| Hardness HDD | 42 | 52 | 55 | 57 | 63 | 65 | 67 |

Incidentally, in Table 3, the morphology of Example 19 showed that particle dispersed phases and net-like (fibrous) dispersed phases which comprised the acrylic triblock copolymer and had an average diameter of not more than 300 nm, were in the matrix comprising the polylactic acid.

Reference Example 12

Production of (B-5) Acrylic Triblock Copolymer (1) A three-neck flask having an internal volume 10 L was equipped with a three-way cock, and the inside of the flask was deaerated and displaced with nitrogen. Under a room temperature, to the flask were added 5080 g of a dried toluene, 508 g of 1,2-dimethoxyethane, and 347 ml of the toluene solution containing the isobutylbis (2,6-di-t-butyl-4-methylphenoxy) aluminum obtained in Reference Example 1 (208 mmol of the organoaluminum compound was contained in the solution). Further, 27.8 mmol of s-butyllithium was added to the flask and then 238 g of methyl methacrylate was added thereto. The mixture was polymerized at a room temperature for 1 hour, and 0.1 g of the polymerization (reaction) solution was sampled (aliquot sample 1).

(2) Following the polymerization (1), the internal temperature of the polymerization solution was cooled down to −25° C., and 1960 g of n-butyl acrylate was added dropwise thereto over 2 hours for a polymerization. After the completion of dropping of n-butyl acrylate, 0.1 g of the reaction solution was sampled (aliquot sample 2).

(3) Following the polymerization (2), to the polymerization (reaction) solution obtained in the (2) 300 g of methyl methacrylate was further added, and the temperature of the reaction solution was allowed to warm to a room temperature and stirred for 8 hours for a polymerization. Then 4 g of methanol was added to the polymerization (reaction) solution to stop the polymerization. The reaction solution after stopping the polymerization was poured into a large amount of methanol to obtain precipitates (aliquot sample 3).

(4) The obtained aliquot samples 1 to 3 were used to determine the molecular weights (the weight-average molecular weight and the number-average molecular weight) of the finally obtained precipitate (aliquot sample 3) and each polymer block and the content of each polymer block by the above-mentioned method. The finally obtained precipitate was an acrylic triblock copolymer [hereinafter referred to as "(B-5) an acrylic triblock copolymer"] comprising a poly (methyl methacrylate) (PMMA)-poly(n-butyl acrylate) (PnBA)-poly(methyl methacrylate) (PMMA). The weight-average molecular weights of one of the two poly(methyl methacrylate) blocks was 9,900, and the number-average molecular weights thereof was 8,800 [the molecular weight distribution (Mw/Mn) was 1.13]. The weight-average molecular weight of another poly(methyl methacrylate) block was 12,500. The weight-average molecular weight of the poly(n-butyl acrylate) block situated in the center of the acrylic triblock copolymer (B-5) was 81,800. The weight-average molecular weight of the acrylic triblock copolymer (B-5) was 116,000, and the number-average molecular weight thereof was 108,000 [the molecular weight distribution (Mw/Mn) was 1.07].

Moreover, the mass ratio of each polymer block relative to the obtained acrylic triblock copolymer (B-5) was PMMA (9.5% by mass)-PnBA (78.5% by mass)-PMMA (12% by mass) (the degree of asymmetricity was 1.26).

(5) Further, the obtained samples 1 to 3 was used to measure the glass-transition temperatures of each polymer block of the acrylic triblock copolymer (B-5) by the above-mentioned method. The glass-transition points of both PMMA blocks at the ends of the acrylic triblock copolymer were 141° C., and the glass-transition temperature of the PnBA block in the center of the acrylic triblock copolymer was −24° C.

(6) In addition, the obtained sample 3 was used to measure the melt viscosity ($\eta_B$) of the acrylic triblock copolymer (B-5) at a temperature of 200° C. and a shear rate of 100 sec$^{-1}$ and the specific gravity (25° C.) of the acrylic triblock copolymer (B-5) by the above-mentioned methods. The melt viscosity ($\eta_B$) was 250 Pa·s and the specific gravity (25° C.) was 1.05.

Reference Example 13

Production of (B-6) Acrylic Triblock Copolymer (1) A three-neck flask having an internal volume 10 L was equipped with a three-way cock, and the inside of the flask was deaerated and displaced with nitrogen. Under a room temperature, to the flask were added 5080 g of a dried toluene, 508 g of 1,2-dimethoxyethane, and 347 ml of the toluene solution containing the isobutylbis(2,6-di-t-butyl-4-methylphenoxy) aluminum obtained in Reference Example 1 (208 mmol of the organoaluminum compound was contained in the solution). Further, 21.9 mmol of s-butyllithium was added to the flask and then 94 g of methyl methacrylate was added thereto. The mixture was polymerized at a room temperature for 1 hour, and 0.1 g of the polymerization (reaction) solution was sampled (aliquot sample 1).

(2) Following the polymerization (1), the internal temperature of the polymerization solution was cooled down to −25° C., and 1750 g of n-butyl acrylate was added dropwise thereto over 2 hours for a polymerization. After the completion of dropping of n-butyl acrylate, 0.1 g of the reaction solution was sampled (aliquot sample 2).

(3) Following the polymerization (2), to the polymerization (reaction) solution obtained in the step (2) 656 g of methyl methacrylate was further added, and the temperature of the reaction solution was allowed to warm to a room temperature and stirred for 8 hours for a polymerization. Then 4 g of methanol was added to the polymerization (reaction) solution to stop the polymerization. The reaction solution after stopping the polymerization was poured into a large amount of methanol to obtain precipitates (aliquot sample 3).

(4) The obtained aliquot samples 1 to 3 were used to determine the molecular weights (the weight-average molecular weight and the number-average molecular weight) of the finally obtained precipitate (aliquot sample 3) and each polymer block and the content of each polymer block by the above-mentioned method. The finally obtained precipitate was an acrylic triblock copolymer [hereinafter referred as "(B-6) an acrylic triblock copolymer"] comprising a poly(methyl methacrylate) (PMMA)-poly(n-butyl acrylate) (PnBA)-poly(methyl methacrylate) (PMMA). The weight-average molecular weight of one of the two poly(methyl methacrylate) blocks was 5,000, and the number-average molecular weight thereof was 4,500 [the molecular weight distribution (Mw/Mn) was 1.11]. The weight-average molecular weight of another poly(methyl methacrylate) block was 35,000. The weight-average molecular weight of the poly(n-butyl acrylate) block situated in the center of the acrylic triblock copolymer (B-6) was 93,300. The weight-average molecular weight of the acrylic triblock copolymer (B-6) was 133,000, and the number-average molecular weight thereof was 111,000 [the molecular weight distribution (Mw/Mn) was 1.2].

Moreover, the mass ratio of each polymer block relative to the obtained acrylic triblock copolymer (B-6) was PMMA (3.8% by mass)-PnBA (70% by mass)-PMMA (26.2% by mass) (the degree of asymmetricity was 6.89).

(5) Further, the obtained samples 1 to 3 were used to measure the glass-transition temperatures of each polymer block of the acrylic triblock copolymer (B-6) by the above-mentioned method. The glass-transition points of both PMMA blocks at the ends of the acrylic triblock copolymer were 143° C., and the glass-transition temperature of the PnBA block in the center of the acrylic triblock copolymer was −23° C.

(6) In addition, the obtained sample 3 was used to measure the melt viscosity ($\eta_B$) of the acrylic triblock copolymer (B-6) at a temperature of 200° C. and a shear rate of 100 sec$^{-1}$ and the specific gravity (25° C.) of the acrylic triblock copolymer (B-6) by the above-mentioned methods. The melt viscosity ($\eta_B$) was 750 Pa·s and the specific gravity (25° C.) was 1.05.

Reference Example 14

Production of (B-7) Acrylic Triblock Copolymer (1) A three-neck flask having an internal volume 10 L was equipped with a three-way cock, and the inside of the flask was deaerated and displaced with nitrogen. Under a room temperature, to the flask were added 5080 g of a dried toluene, 508 g of 1,2-dimethoxyethane, and 347 ml of the toluene solution containing the isobutylbis(2,6-di-t-butyl-4-methylphenoxy)aluminum obtained in Reference Example 1 (208 mmol of the organoaluminum compound was contained in the solution). Further, 15.9 mmol of s-butyllithium was added to the flask and then 68 g of methyl methacrylate was added thereto. The mixture was polymerized at a room temperature for 1 hour, and 0.1 g of the polymerization (reaction) solution was sampled (aliquot sample 1).

(2) Following the polymerization (1), the internal temperature of the polymerization solution was cooled down to −25° C., and 1750 g of n-butyl acrylate was added dropwise thereto over 2 hours for a polymerization. After the completion of dropping of n-butylacrylate, 0.1 g of the reaction solution was sampled (aliquot sample 2).

(3) Following the polymerization (2), to the polymerization (reaction) solution obtained in the step (2) 682 g of methyl methacrylate was further added, and the temperature of the reaction solution was allowed to warm to a room temperature and stirred for 8 hours for a polymerization. Then 4 g of methanol was added to the polymerization (reaction) solution to stop the polymerization. The reaction solution after stopping the polymerization was poured into a large amount of methanol to obtain precipitates (aliquot sample 3).

(4) The obtained aliquot samples 1 to 3 were used to determine the molecular weights (the weight-average molecular weight and the number-average molecular weight) of the finally obtained precipitate (aliquot sample 3) and each polymer block and the content of each polymer block by the above-mentioned method. The finally obtained precipitate was an acrylic triblock copolymer [hereinafter referred as "(B-7) an acrylic triblock copolymer"] comprising a poly(methyl methacrylate) (PMMA)-poly(n-butyl acrylate) (PnBA)-poly(methyl methacrylate) (PMMA). The weight-average molecular weights of one of the two poly(methyl methacrylate) blocks was 5,000, and the number-average molecular weights thereof was 4,500 [the molecular weight distribution (Mw/Mn) was 1.11]. The weight-average molecular weight of another poly(methyl methacrylate) block was 50,000. The weight-average molecular weight of the poly(n-butyl acrylate) block situated in the center of the acrylic triblock copolymer (B-7) was 128,000. The weight-average molecular weight of the acrylic triblock copolymer (B-7) was 183,000, and the number-average molecular weight thereof was 147,000 [the molecular weight distribution (Mw/Mn) was 1.24].

Moreover, the mass ratio of each polymer block relative to the obtained acrylic triblock copolymer (B-7) was PMMA (2.7% by mass)-PnBA (70% by mass)-PMMA (27.3% by mass) (the degree of asymmetricity was 10.1).

(5) Further, the obtained samples 1 to 3 were used to measure the glass-transition temperatures of each polymer block of the acrylic triblock copolymer (B-7) by the above-mentioned method. The glass-transition points of both PMMA blocks at the ends of the acrylic triblock copolymer were 145° C., and the glass-transition temperature of the PnBA block in the center of the acrylic triblock copolymer was −23° C.

(6) In addition, the obtained sample 3 was used to measure the melt viscosity ($\eta_B$) of the acrylic triblock copolymer (B-7) at a temperature of 200° C. and a shear rate of 100 sec$^{-1}$ and the specific gravity (25° C.) of the acrylic triblock copolymer (B-7) by the above-mentioned methods. The melt viscosity ($\eta_B$) was 1280 Pa·s and the specific gravity (25° C.) was 1.05.

Examples 20 to 24

(1) As shown in Table 4, the polylactic acid (A-2), the acrylic triblock copolymer shown in Table 4, and a hydrolysis suppressing agent ("Carbodilite LA-1" manufactured by Nisshinbo Industries Inc.) were mixed each other in the proportion shown in Table 4. The mixture was fed into a twin screw extruder ("ZSK-25" manufactured by Werner & Pfleiderer GmbH) and melt-kneaded at 200° C. and cut to produce pellets of the polylactic acid compositions.

(2) the polylactic acid composition obtained in the step (1) was press molded by using a thermal compression molding machine (manufactured by Shinto metal Industries, Ltd.), under the condition that the temperature was 200° C. and the pressure was 10 MPa, to produce a press sheet having a length of 200 mm, a width of 200 mm, and a thickness of 0.5 mm. The tensile properties of the press sheet were measured or evaluated by the above-mentioned methods, and the results were as shown in Table 4.

[Table 4]

TABLE 4

|  | Ex. 20 | Ex. 21 | Ex. 22 | Ex. 23 | Ex. 24 |
| --- | --- | --- | --- | --- | --- |
| (A-2) Polylactic acid (parts) | 70 | 70 | 70 | 70 | 70 |
| (B-1) Copolymer (symmetric) (parts) | 30 | — | — | — | — |
| (B-3) Copolymer (symmetric) (parts) | — | 30 | — | — | — |
| (B-4) Copolymer (degree of asymmetricity of 2.13) (parts) | — | — | — | — | 10 |
| (B-5) Copolymer (degree of asymmetricity of 1.26) (parts) | — | — | 30 | — | 20 |
| (B-6) Copolymer (degree of asymmetricity of 6.98) (parts) | — | — | — | 30 | — |
| Hydrolysis suppressing agent (parts) | 0.7 | 0.7 | 0.7 | 0.7 | 0.7 |
| Morphology | I | I | I | II | II |
| (P) Parameter | 2.41 | 2.28 | 1.92 | 0.64 | 0.9 |
| MFR (g/10 minutes) | 11 | 9.4 | 6.1 | 1.5 | 4.2 |
| Maximum tensile stress in MD (MPa) | 7.7 | 9.4 | 8.4 | 30 | 23 |
| Maximum tensile stress in TD (MPa) | 7.1 | 8.3 | 6.9 | 28 | 21 |
| Elongation at break in MD (%) | 28 | 25 | 43 | 100 | 93 |
| Elongation at break in TD (%) | 29 | 31 | 36 | 140 | 54 |
| Elastic modulus in MD (MPa) | 31 | 58 | 61 | 1200 | 860 |
| Elastic modulus in TD (MPa) | 28 | 39 | 37 | 1100 | 880 |

As apparent from the results in Table 4, the sheets in Examples 22 to 24, which were obtained from the asymmetric acrylic triblock copolymers, had higher toughness than the sheets in Examples 20 and 21, which were obtained from the symmetric acrylic triblock copolymers. In addition, the textures of the sheets in Examples 22 to 24 were less sticky and the sheets had more excellent dynamical strength.

Examples 25 to 29

Except for using 90 parts by mass of the polylactic acid (A-2), 10 parts by mass of one of the following acrylic triblock copolymer, and 0.7 parts by mass of the a hydrolysis suppressing agent, the same procedures were used as in Examples 20 to 24 to produce polylactic acid compositions. The acrylic triblock copolymer used in Examples 25 to 29 were the acrylic triblock copolymer (B-1), (B-3) to (B-6), respectively. The polylactic acid compositions were evaluated by the same manner as in Examples 20 to 24. According to the evaluation results, the similar improvements in those in Examples 20 to 24 were recognized.

Example 30

Except for using the acrylic triblock copolymer (B-7) obtained in Reference Example 14 as an acrylic triblock copolymer, the same procedures were used as in Example 20 to produce a polylactic acid composition. The press sheet obtained from the polylactic acid composition was evaluated as less flexible and tacky.

Example 31

The polylactic acid composition [the polylactic acid (A-1) relative to the acrylic triblock (B-1) was 90:10 (mass ratio)] obtained in the (1) in Example 1 was used to produce the film having a width of 300 mm and a thickness of 100 µm in the (2) in Example 9. A cloth substrate comprising a polylactic acid ("Terramac" manufactured by Unitika Ltd.) was put between two sheets of the obtained films and subjected to lamination at 150° C. by a laminating machine (or a laminator) to produce a tarpaulin having a three-ply structure comprising the polylactic acid composition layer, the cloth substrate, and the polylactic acid composition layer. Since the polylactic acid composition layers firmly adhered to the cloth substrate, the obtained tarpaulin was greatly durable and curl resistant. The tarpaulin also had an excellent printing property.

Example 32

Except for using the film having a width of 300 mm and a thickness of 100 µm the same procedure was used as in Example 31 to produce a tarpaulin. Incidentally, the film was produced in the step (2) in Example 9 from the polylactic acid composition [the polylactic acid (A-1) relative to the acrylic triblock (B-1) was 70:30 (mass ratio)] obtained in the step (1) in Example 2. The obtained tarpaulin was soft and had an excellent texture. The tarpaulin also had superb durability and printing property.

Example 33

Production of the Composite Molded Product by Insert Molding

A composite molded plate was independently produced by the following manner: placing (or inserting) one of the following polar resins having a strip shape in a mold; and injecting the polylactic acid composition obtained in the step (1) in Example 1 into the same mold by an injection molding machine (cylinder temperature was 200° C.) to mold a composite plate in which a layers comprising a polar resin and a layer comprising a poly lactic acid composition were integrally laminated. Incidentally, the polar resin layer has a thickness of 4 mm, a width of 25 mm, and a length 150 mm and the polylactic acid composition layer has a thickness of 3 mm, a width of 25 mm, and a length of 200 mm. The integrations of the layers of the obtained composite plates by molding were adequate for practical use.

Polyamide 66 resin: "LEONA1300S" manufactured by Asahi Kasei Corporation

Polyethylene terephthalate resin: "SKYGREEN PETG S2008" manufactured by SK Chemicals Co., Ltd.

Polycarbonate resin: "Panlight L1225" manufactured by Teijin Ltd.

ABS resin: "Cyclolack EX111" manufactured by General Electric Co.

Acrylic resin: "Parapet GF" manufactured by Kuraray Co., Ltd.

Polystyrene: "GPPS HF77" manufactured by PS Japan Corporation.

Polylactic acid: "PLA6251D" manufactured by Natureworks LLC

Example 34

Except for using the polylactic acid composition obtained in the step (1) in Example 2 instead of the polylactic acid composition obtained in the step (1) in Example 1, the same procedure as in Example 33 was used to produce a composite molded product. Each of the obtained composite plates had more excellent bond of the layers, than the composite plate in Example 33, regardless of any polar resin.

The invention claimed is:

1. A polylactic acid composition comprising (A) a polylactic acid-series resin and (B) an acrylic triblock copolymer, which fulfills the following requirements (1) to (6):

(1)(P) a parameter represented by the following formula (1) is in the range of 0.05 to 10:

$$P=(\eta_A/\eta_B)\times(\phi_B/\phi_A) \quad (1)$$

wherein $\eta_A$ is a melt viscosity (Pa·s) of the polylactic acid-series resin (A) at a temperature of 200° C. and a shear rate of 100 sec$^{-1}$, $\eta_B$ is a melt viscosity (Pa·s) of the acrylic triblock copolymer (B) at a temperature of 200° C. and a shear rate of 100 sec$^{-1}$, $\phi_A$ is a volume fraction (%) (25° C.) of the polylactic acid-series resin (A) relative to the total volume of the polylactic acid-series resin (A) and the acrylic triblock copolymer (B), and $\phi_B$ is a volume fraction (%) (25° C.) of the acrylic triblock copolymer (B) relative to the total volume of the polylactic acid-series resin (A) and the acrylic triblock copolymer (B);

(2) the acrylic triblock copolymer (B) comprises (B1) a polymer block having a glass-transition temperature of not higher than 25° C., (B2a) a polymer block which has a glass-transition temperature of not lower than 60° C. and is bound to a terminal of the polymer block (B1), and (B2b) a polymer block which has a glass-transition temperature of not lower than 60° C. and is bound to another terminal of the polymer block (B1);

(3) the polymer block (B1) contains a unit derived from an acrylic ester as a main structural unit, and the polymer block (B2a) and the polymer block (B2b) independently contain a unit derived from an methacrylic ester unit as a main structural unit;

(4) both of the weight-average molecular weights of the polymer block (B2a) and the polymer block (B2b) are smaller than the weight-average molecular weight of the polymer block (B1), (5) the acrylic triblock copolymer (B) is a polymer obtained by an anionic polymerization in the presence of an organoaluminum compound, and is free from a halogen atom, and (6) the weight average molecular weight of the polymer block (B2a) is larger than the weight average molecular weight of polymer block (B2b), and the proportion (molecular weight ratio) of the weight average molecular weight of the polymer block (B2a) relative to the polymer block (B2b) is 1.2 to 8.

2. A polylactic acid composition according to claim 1, wherein the molecular weight distribution of the acrylic triblock copolymer (B) is in the range of 1 to 1.4.

3. A polylactic acid composition according to claim 1, wherein the acrylic triblock copolymer (B) is a polymer obtained by an anionic polymerization.

4. A polylactic acid composition according to claim 1, wherein the acrylic triblock copolymer (B) comprises (BX) an acrylic triblock copolymer comprising the polymer block (B1) in an amount of 65 to 85% by mass and (BY) an acrylic triblock copolymer comprising the polymer block (B1) in an amount of 40 to 60% by mass, and the proportion (mass ratio) of the acrylic triblock copolymer (BX) relative to that of the acrylic triblock copolymer (BY) is 97:3 to 3:97.

5. A polylactic acid composition according to claim 1, wherein the proportion (molecular weight ratio) of the molecular weight of the polymer block (B2a) relative to that of the polymer block (B2b) is 1.2 to 5.

6. A polylactic acid composition according to claim 1, wherein the proportion (mass ratio) of the polylactic acid-series resin (A) relative to the acrylic triblock copolymer (B) is 97:3 to 40:60.

7. A polylactic acid composition according to claim 1, wherein the melt viscosity ratio ($\eta_A/\eta_B$) (at a temperature of 200° C. and a shear rate of 100 sec$^{-1}$) of the polylactic acid-series resin (A) relative to the acrylic triblock copolymer (B) is 0.1 to 10.

8. A polylactic acid composition according to claim 1, which has a phase separation structure having a phase comprising the polylactic acid-series resin (A) and a phase comprising the acrylic triblock copolymer (B).

9. A polylactic acid composition according to claim 1, which has a phase separation structure selected from the group consisting of the following (I) to (III).

(I) a micro-phase separation structure having a matrix comprising the acrylic triblock copolymer (B) and a micro-dispersed phase comprising the polylactic acid-series resin (A) and dispersed in the matrix, in which the mean diameter of the micro-dispersed phase is not more than 500 nm and the mean distance between the micro-dispersed phases is not more than 100 nm;

(II) a co-continuous structure having a continuous phase comprising the polylactic acid-series resin (A) and a continuous phase comprising the acrylic triblock copolymer (B), in which the mean thickness in the width direction of the continuous phase comprising the acrylic triblock copolymer (B) is not more than 100 nm; and (III) a micro-phase separation structure having a matrix comprising the polylactic acid-series resin (A) and a micro-dispersed phase comprising the acrylic triblock copolymer (B) and dispersed in the matrix, in which the mean diameter of the dispersed phase is not more than 300 nm.

10. A polylactic acid composition according to claim 9, which has the phase separation structure (I), wherein the proportion (mass ratio) of the polylactic acid-series resin (A) relative to the acrylic triblock copolymer (B) [the polylactic acid-series resin (A): the acrylic triblock copolymer (B)] is 75:25 to 40:60, and the parameter (P) represented by the formula (1) is in the range of 1.7 to 10.

11. A polylactic acid composition according to claim 9, which has the phase separation structure (II), wherein the proportion (mass ratio) of the polylactic acid-series resin (A)

relative to the acrylic triblock copolymer (B) [the polylactic acid-series resin (A): the acrylic triblock copolymer (B)] is 75:25 to 40:60, the parameter (P) represented by the formula (1) is 0.05 to 1.7, and the proportion of the polymer block (B1) in the acrylic triblock copolymer (B) is 25 to 65% by mass.

12. A polylactic acid composition according to claim 9, which has the phase separation structure (III), wherein the proportion (mass ratio) of the polylactic acid-series resin (A) relative to the acrylic triblock copolymer (B) [the polylactic acid-series resin (A): the acrylic triblock copolymer (B)] is 97:3 to 75:25, the parameter (P) represented by the formula (1) is 0.05 to 1.7, and the proportion of the polymer block (B1) in the triblock copolymer (B) is more than 65% by mass.

13. A molded product comprising a polylactic acid composition recited in claim 1.

14. A molded product according to claim 13, which has a three-dimensional form or is a fiber or a film.

15. An adhesive film, which comprises a substrate film comprising a polylactic acid composition recited in claim 1 cand an adhesive layer formed on the substrate film.

16. An adhesive film according to claim 15, which is a co-extrusion molded film comprising the substrate film and the adhesive layer.

17. An adhesive film according to claim 15, wherein the adhesive layer comprises an adhesive agent containing an acrylic block copolymer.

18. A tarpaulin, which comprises a cloth substrate and a layer comprising a polylactic acid composition recited in claim 1, wherein the layer is formed on at least one of the surface of the cloth substrate.

19. A tarpaulin according to claim 18, wherein the cloth substrate comprises a polylactic acid-series fiber.

20. A composite molded product, which is obtainable by composite molding a polylactic acid composition recited in claim 1 and at least one polar resin selected from the group consisting of a polyamide-series resin, a polyester-series resin, a polycarbonate-series resin, a styrenic resin, an acrylic resin, and a polylactic acid-series resin.

21. A composite molded product according to claim 20, wherein the polar resin is the polylactic acid-series resin.

* * * * *